US008271638B2

(12) United States Patent
Yoshimura et al.

(10) Patent No.: US 8,271,638 B2
(45) Date of Patent: Sep. 18, 2012

(54) NODE MANAGEMENT APPARATUS AND METHOD

(75) Inventors: Motoki Yoshimura, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 12/672,991

(22) PCT Filed: Jun. 24, 2009

(86) PCT No.: PCT/JP2009/002903
§ 371 (c)(1),
(2), (4) Date: Feb. 10, 2010

(87) PCT Pub. No.: WO2010/150312
PCT Pub. Date: Dec. 29, 2010

(65) Prior Publication Data
US 2011/0213866 A1    Sep. 1, 2011

(51) Int. Cl.
*G06F 15/173* (2006.01)
(52) U.S. Cl. ........................ 709/223; 709/224
(58) Field of Classification Search .............. 709/223, 709/224, 225, 226; 714/39, 47.1, 47.2, 47.3
See application file for complete search history.

(56) References Cited

U.S. PATENT DOCUMENTS

| | | | |
|---|---|---|---|
| 6,138,122 A | 10/2000 | Smith et al. | |
| 6,405,310 B1 | 6/2002 | Simpson | |
| 6,917,288 B2* | 7/2005 | Kimmel et al. | 340/511 |
| 7,506,048 B1* | 3/2009 | Motoyama | 709/224 |
| 2005/0204032 A1 | 9/2005 | Mirza-Baig | |
| 2005/0216578 A1* | 9/2005 | Thompson | 709/223 |
| 2005/0267928 A1* | 12/2005 | Anderson et al. | 709/200 |
| 2006/0041928 A1 | 2/2006 | Masuoka | |
| 2006/0080429 A1 | 4/2006 | Motoyama et al. | |
| 2006/0165103 A1* | 7/2006 | Trudeau et al. | 370/401 |
| 2006/0224705 A1 | 10/2006 | Takase | |
| 2007/0067430 A1 | 3/2007 | Hirata et al. | |
| 2009/0013065 A1 | 1/2009 | Nagashima | |
| 2010/0309501 A1 | 12/2010 | Hagiuda | |

FOREIGN PATENT DOCUMENTS

| | | |
|---|---|---|
| EP | 1 631 003 | 3/2006 |
| JP | 11-327946 A | 11/1999 |
| JP | 2000-172600 | 6/2000 |

(Continued)

OTHER PUBLICATIONS

J. Schoenwaelder, "Simple Network Management Protocol (SNMP) Context EngineID Discovery," Sep. 2008, IETF, RFC5343, tools.ietf. org/html/rfc5343.*

(Continued)

*Primary Examiner* — Wing Chan
*Assistant Examiner* — Ruolei Zong
(74) *Attorney, Agent, or Firm* — Foley & Lardner LLP

(57) ABSTRACT

A storage resource stores a plugin information package, which is an information package comprising definition information for plugging in a node device as a management target. The definition information is information denoting at the least one of a method for acquiring information from a node device and an item of information to be acquired from a node device. A processor references the plugin information package, which is stored in the storage resource, and accesses a node device via a communication interface device based on the referenced plugin information package. The node device comprising information that has been correctly acquired in accordance with this access is regarded as the management target.

15 Claims, 21 Drawing Sheets

FOREIGN PATENT DOCUMENTS

| | | |
|---|---|---|
| JP | 2001-060180 | 3/2001 |
| JP | 2005-044355 | 2/2005 |
| JP | 2005-174244 | 6/2005 |
| JP | 2005-175736 | 6/2005 |
| JP | 2005-175736 A | 6/2005 |
| JP | 2006-058938 A | 3/2006 |
| JP | 2006-085689 | 3/2006 |
| JP | 2007-041803 | 2/2007 |
| JP | 2009-053862 A | 3/2009 |
| JP | 2010-072873 | 4/2010 |

OTHER PUBLICATIONS

D. Harrington et al., "An Architecture for Describing Simple Network Management Protocol (SNMP) Management Frameworks," Sep. 2008, IETF, RFC3411, tools.ietf.org/html/rfc3411.*

R. Siamwalla et al., "Discovering internet topology," May 1999, Cornell University, Ithaca, NY, Technical Report, www.cs.cornell.edu/skeshav/papers/discovery.pdf.*

S. Pandey et al., "IP network topology discovery using SNMP," Jan. 2009, IEEE, ieeexplore.ieee.org/xpls/abs_all.jsp?arnumber=4897254&tag=1.*

PCT International Search Report on Application No. PCT/JP2010/060999 dated Aug. 10, 2010; 7 pages (with partial English-language translation).

U.S. Appl. No. 12/866,880, filed Aug. 9, 2010, Sugata et al.

U.S. Appl. No. 12/937,961, filed Oct. 14, 2010, Matsumoto et al.

International Search Report for PCT Application No. PCT/JP2009/002903 dated Sep. 15, 2009.

Translation of International Search Report for PCT Application No. PCT/JP2009/002903 dated Sep. 15, 2009.

PCT International Search Report and Written Opinion on application No. PCT/JP2010/060064 dated Sep. 7, 2010; 5 pages (with partial translation—1 page).

USPTO non-final action on U.S. Appl. No. 12/866,880 mailed Mar. 15, 2012; 17 pages.

* cited by examiner

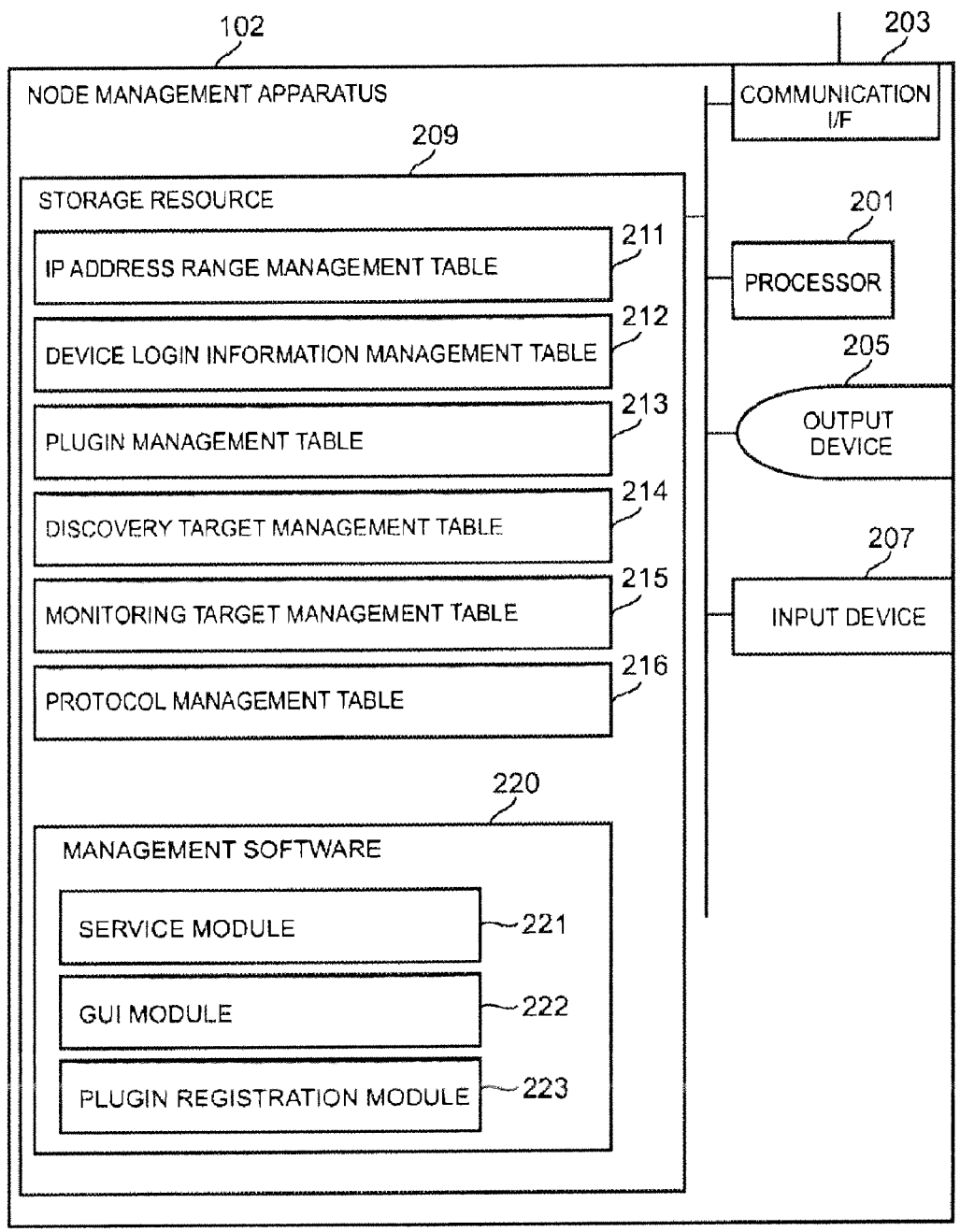

| ID | START IP ADDRESS | END IP ADDRESS | VALID LOGIN ID | VALID PLUGIN ID |
|---|---|---|---|---|
| Range1 | 192.168.5.5 | 192.168.5.50 | ALL | ALL |
| Range2 | 192.168.6.1 | 192.168.6.10 | Login 1, Login 2 | NONE |
| Range3 | 192.168.6.101 | 92.168.6.110 | Login 5, Login 6 | plugin1, plugin2 |
| .. | .. | .. | .. | .. |

| ID | PROTOCOL | USER ID | PASSWORD |
|---|---|---|---|
| Login 1 | WMI | Administrator | ******** |
| Login 2 | SSH | root | ******** |
| Login 3 | SMI-S WBEM | user1 | ******** |
| .. | .. | .. | .. |

| ID | DEFINITION INFORMATION | MESSAGE RESOURCE | ICON RESOURCE |
|---|---|---|---|
| plugin 1 | ownProtocol=ssh, ... | ~¥Server.properties | ~¥server1.gif, ... |
| plugin 2 | ownProtocol=snmp, ... | ~¥St1.properties | ~¥st1.gif, ... |
| plugin 3 | ownProtocol=snmp, ... | ~¥St2.properties | ~¥st2.gif, ... |
| : | : | : | : |

| IP ADDRESS | LOGIN ID | DEVICE NAME | DEVICE TYPE | STATUS | PLUGIN ID |
|---|---|---|---|---|---|
| 192.168.5.5 | Login 1 | WINCOM | Host | Success | plugin 1 |
| 192.168.6.1 | Login 2 | LINCOM | Host | Success | plugin 1 |
| 192.168.6.101 | Login 3 | - | - | Unknown | plugin 2 |
| : | : | : | : | : | : |

| ID 701 | IP ADDRESS 702 | LOGIN ID 703 | DEVICE NAME 704 | TYPE 705 | VENDOR 706 | OS 707 | CPU 708 | PLUGIN ID 709 |
|---|---|---|---|---|---|---|---|---|
| 1 | 192.168.5.5 | Login 1 | WINCOM | Host | Micro... | Win... | Pent... | plugin 1 |
| 2 | 192.168.6.1 | Login 2 | LINCOM | Host | RedH... | Linu... | Pent... | plugin 5 |
| .. | .. | .. | .. | .. | .. | .. | .. | .. |

| ORDER OF PRIORITY 801 | DEVICE TYPE / PROTOCOL 802 |
|---|---|
| 1 | Windows Server / WMI |
| 2 | Linux Server / SSH |
| 3 | Storage / SNM-API |
| .. | .. |

FIG. 6

LIST OF IP ADDRESS RANGES

| | ID | VALID LOGIN ID | VALID LOGIN ID | ACTION | |
|---|---|---|---|---|---|
| ☑ | Range5 | ALL | ALL | DELETE | CHANGE |
| ☑ | Range6 | ALL | NOT USED | DELETE | CHANGE |
| ☑ | Range7 | Login 1, Login 2 | Plugin 1, Plugin 2, ... | DELETE | CHANGE |
| | : | : | : | : | |

[ADD] (611), 612, 617

LOGIN LIST

| IDENTIFIER | PROTOCOL | UserID | ACTION | |
|---|---|---|---|---|
| Login 1 | WMI | user1 | DELETE | CHANGE |
| Login 2 | SSH | user2 | DELETE | CHANGE |
| Login 3 | SMI-S | user3 | DELETE | CHANGE |
| : | : | : | : | |

[ADD] (613), 614, 619

[EXECUTE AUTO-DISCOVERY] (615)

IP ADDRESS RANGE SETTING

RANGE NAME (ID) : ◻ ~1711

START IP ADDRESS : ◻ ◻ ◻ ◻ ~1712

END IP ADDRESS : ◻ ◻ ◻ ◻ ~1713

DEVICE LOGIN INFORMATION TO BE USED

○ ALL    1714

● SELECT

☑ Login1  ☑ Login2  ☑ Login3  ☐ Login4
☐ Login5  ☑ Login6  ☐ Login7  ☐ Login8    } 1715

PLUGIN TO BE APPLIED

○ ALL    ○ DO NOT APPLY    1716

● SELECT

☑ plugin1  ☑ plugin2  ☑ plugin3  ☑ plugin4
☐ plugin5  ☐ plugin6  ☐ plugin7  ☐ plugin8    } 1717

1718 — [ OK ]   [ CANCEL ]

1701

NODE MANAGEMENT APPARATUS AND METHOD

TECHNICAL FIELD

The present invention relates to technology for managing a node device.

BACKGROUND ART

In a system, that is a computer system, in which node devices typified by a host device, a storage apparatus, and/or a switching device are coupled together via a network, the management of the node devices is an important task in the operation of the computer system. Information must be acquired from a node device in order to manage the node device. For example, the technology disclosed in Patent Literature 1 is known as technology for acquiring information from a node device. According to Patent Literature 1, a machine that comprises an IP address in a range of specified IP addresses is discovered, and information is acquired from the discovered machine.
[Citation List]
[Patent Literature]
[PTL 1]
Japanese Patent Application Laid-open No. 2005-175736

SUMMARY OF INVENTION

Technical Problem

Now then, there are cases in which it is difficult to correctly manage a node device. One reason for this is that a newly discovered host device may have a new information acquisition method and/or a new item of information that is required for management, thereby making it impossible to correctly acquire information from this node device.

An object of the present invention is to make it possible to correctly manage a node device.

Solution to Problem

A node management apparatus comprises a storage resource (a physical storage device such as a memory and/or a hard disk), a communication interface device, and a processor that is coupled to the storage resource and the communication interface device.

The storage resource stores a plugin information package, which is an information package comprising definition information for making a node device a management target. The information package, for example, may be any kind of package, such as a file or one row in a table. The definition information is information denoting at the least one of the following (N1) through (N3):
 (N1) a method for acquiring information from a node device;
 (N2) an item of information to be acquired from the node device; and
 (N3) mapping information for a node management model of information acquired from the node device.
The processor:
 (X) references the plugin information package stored in the storage resource; and
 (Y) accesses the node device by way of the communication interface device on the basis of the referenced plugin information package.

The node device comprising the information correctly acquired in accordance with the access in (Y) is regarded as the management target.

An administrator is able to correctly manage even a node device having a new information acquisition method and/or a new item of information that must be managed by carrying out the above-mentioned processing.

The processing performed by a node management apparatus according to the present invention may be carried out in accordance with the processor inside the node management apparatus executing a computer program. The computer program may be installed from a program source. The program source, for example, may be a remote server or computer-readable storage medium (for example, a portable storage medium such as a CD-ROM or a DVD (Digital Versatile Disk). At the least a portion of the processing of the node management apparatus may be realized via a hardware circuit. Further, the node management apparatus may be constructed from one or more computers.

BRIEF DESCRIPTION OF DRAWINGS

FIG. 2 shows the configuration of the node management apparatus 102.
FIG. 3A shows an IP address range management table 211.
FIG. 3B shows a login management table 212.
FIG. 4A shows a plugin management table 213.
FIG. 4B shows a discovery target management table 214.
FIG. 5A shows a monitoring target management table 215.
FIG. 5B shows a protocol management table 216.
FIG. 6 shows a discovery home GUI 601.
FIG. 8 shows an address setting GUI 1701.

DESCRIPTION OF EMBODIMENTS

Figure 1:
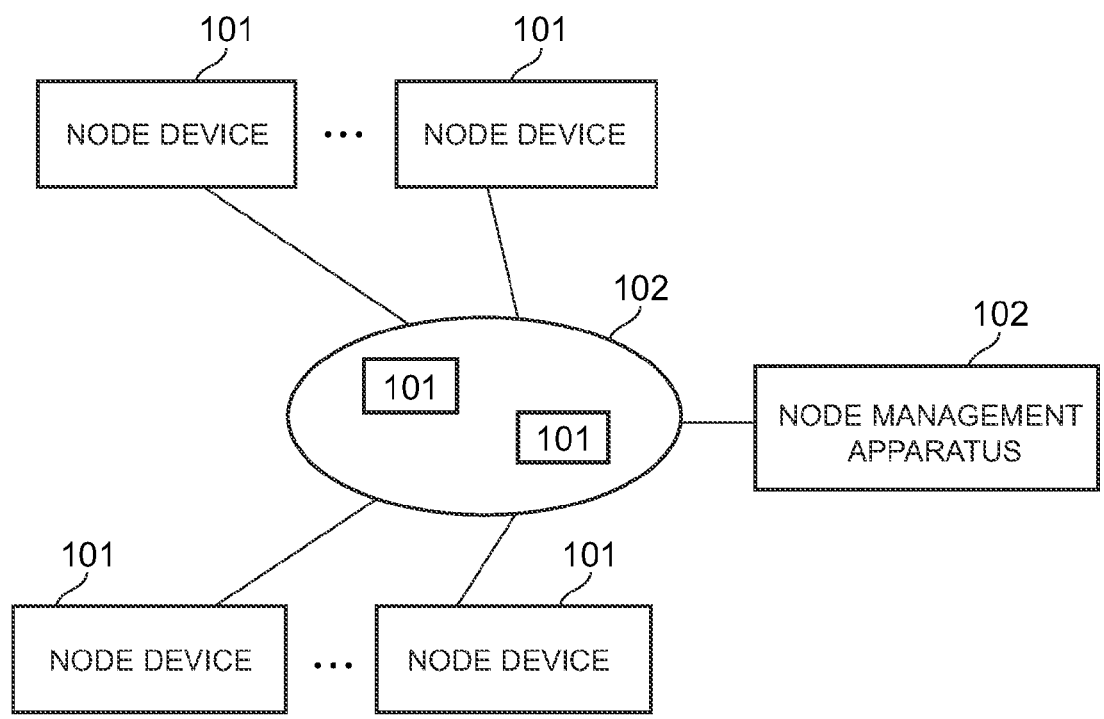
FIG. 1 shows a computer system comprising a node management apparatus related to one embodiment of the present invention.

One embodiment of the present invention will be explained below while referring to the drawings.

Furthermore, in the following explanation, there is information that is expressed as "xxx table". However, the information may be expressed using a data structure other than a table.

Further, in the following explanation, there may be instances when a computer program (software) is used as the subject of an explanation, but in actuality a prescribed process is carried out by the processor (typically a microprocessor) executing the program. A storage resource, such as a memory and a communication interface device (for example, a communication port) may also be used at this time. The processor may also be the subject of an explanation about processing carried out in accordance with the processor executing a program. Further, processing that is explained having the program as the subject may be processing that is performed by the node management apparatus. Either all or a portion of the programs may be realized using dedicated hardware.

FIG. 1 shows a computer system comprising a node management apparatus related to one embodiment of the present invention.

The computer system comprises a plurality of node devices 101. The respective node devices 101 are coupled to a communication network 101. The node devices 101 are of various types. In this embodiment, the type of node device 101, for example, may be either a host device, a storage apparatus, a router device or a switching device. However, the node device 101 may be a device other than the above-mentioned devices. Further, the node devices of the computer system do not need to be the same type. The host device issues an I/O (Input/Output) command to the storage apparatus. The switching device receives the I/O command and transfers this command to the storage apparatus or to another switching device. The storage apparatus receives and processes the I/O command. Specifically, for example, the storage apparatus comprises a plurality of physical storage devices according to a RAID (Redundant Array of Independent (of Inexpensive) Disks) and a storage controller. A logical volume is created on the basis of a plurality of physical storage devices. The storage controller carries out I/O processing with respect to the logical volume (hereinafter, the target volume) specified from the received I/O command. In a case where the I/O command is a write command, the storage controller stores write-targeted data received accompanying the write command in the physical storage device that constitutes the basis of the target volume. Alternatively, in a case where the I/O command is a read command, the storage controller reads the read-targeted data from the physical storage device that constitutes the basis of the target volume, and sends this data to the host device.

The communication network 102 is a network (for example, a LAN or the Internet) over which communications are carried out using the IP (Internet Protocol). However, the present invention is not limited to this, and another type of network may be used.

The node management apparatus 102 monitors the management-target node device 101 from among the plurality of node devices 101.

In the computer system described hereinabove, it is possible to correctly manage even a node device 101 having a new information acquisition method and/or a new item of information that must be managed by comparing this node device 101 to either the point in time at which the node management apparatus 102 commenced operation or the point in time at which the management software executed by the node management apparatus 102 was created. For this reason, in this embodiment, the node management apparatus comprises a storage resource (a physical storage device, such as a memory and/or a hard disk), a communication interface device, and a processor that is coupled to the storage resource and the communication interface device.

The storage resource of the node management apparatus 102 stores a plugin information package, which is an information package comprising definition information for making a node device a management target. The information package, for example, may be any kind of package, such as a file or one row of a table. The definition information is information denoting at the least one of the following (N1) through (N3):

(N1) a method for acquiring information from a node device;

(N2) an item of information to be acquired from the node device; and (N3) mapping information for a node management model of information acquired from the node device.

The processor of the node management apparatus 102:

(X) references the plugin information package stored in the storage resource; and (Y) accesses the node device by way of the communication interface device on the basis the referenced plugin information package.

Then, the node device comprising the information correctly acquired in accordance with the access in (Y) is regarded as the management target.

Carrying out the above-mentioned processing makes it possible for an administrator to correctly manage even a node device having a new information acquisition method and/or a new item of information that must be managed.

The plugin information package is provided from a specified vendor, for example, the node device vendor (for example, an ISV (Independent Software Vendor), hereinafter, the node vendor). There is more than one node vendor. For example, it is possible that a first node vendor provides a first plugin information package that conforms to a first node device that the first node vendor provides, and a second node vendor, that differs from the first node vendor, provides a second plugin information package that conforms to a second node device that the second node vendor provides.

In a case where two plugin information packages are used together like this, there is the possibility that the second node device will be accessed on the basis of the first plugin information package, and, in addition, that information will be acquired inappropriately from the second node device. This is because the first node vendor creates the first plugin information package without knowing the method for acquiring information from the second node device and/or the item of information to be acquired from the second node device. In other words, it is because the first node vendor is unable to define in the first plugin information package a condition that prevents information from being inappropriately acquired from the second node device.

However, since there are two node devices, i.e., the first node device and the second node device, it is preferable that the node management apparatus retain both the first plugin information package and the second plugin information package.

Figure 17:
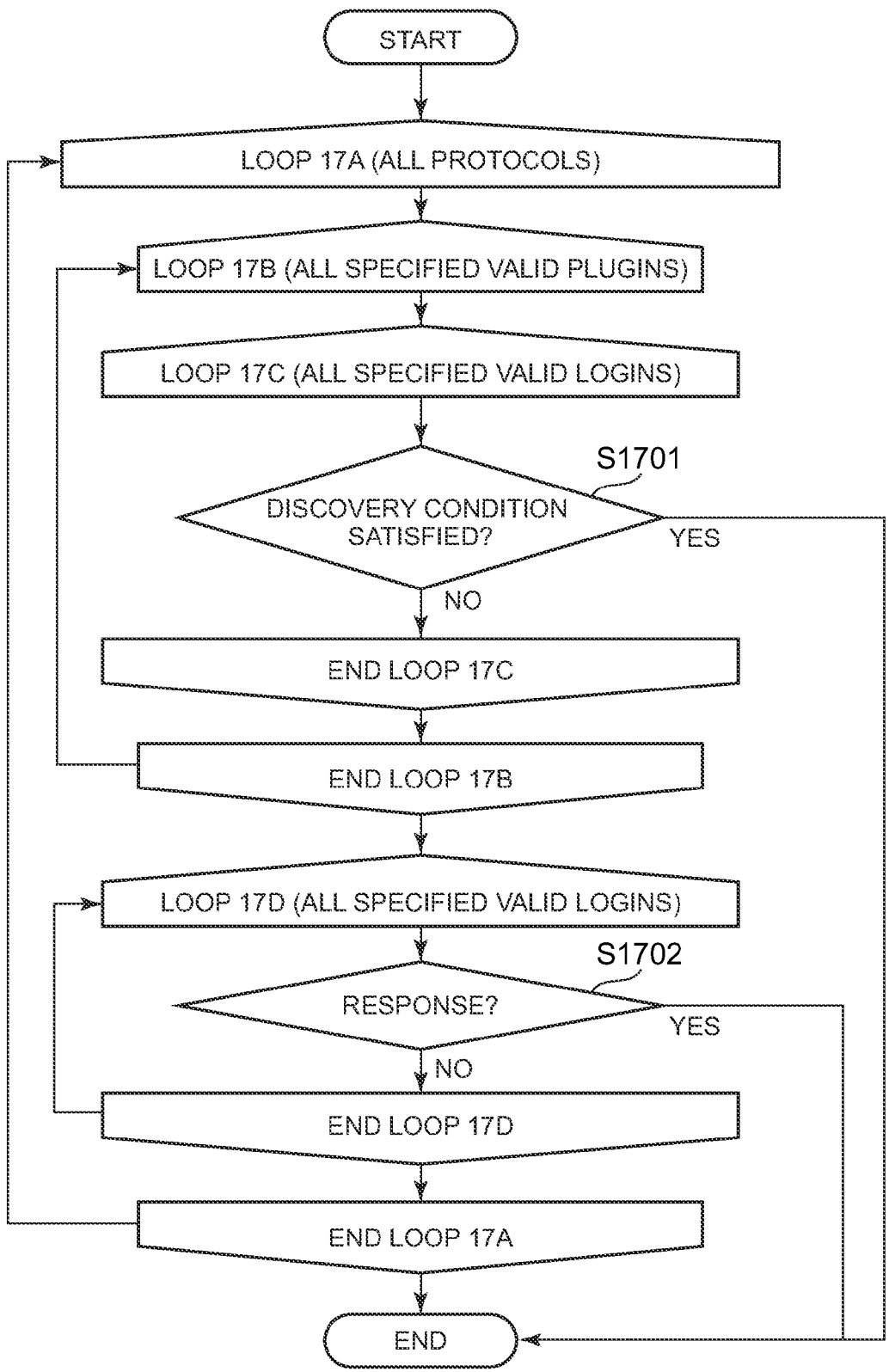
FIG. 17 shows the flow of processing of a node discovery.

Accordingly, as a preferred embodiment, the node management apparatus, for example, may carry out at the least one of the following processes (a) through (e):

(a) specify a valid and/or invalid plugin information package from among the plurality of plugin information packages that are stored in the storage resource for each address range. Specifically, for example, the processor receives an address range and a specification of a valid and/or invalid plugin information package from the user, and stores in the storage resource information denoting the corresponding relationship between the address range and the valid and/or invalid plugin information package;

(b) either instead of or in addition to the above, the processor automatically determines a valid/invalid plugin information package for an address range, and stores in the storage resource information denoting the result of this determination (information denoting the corresponding relationship between the address range and the valid/invalid plugin information package);

(c) the processor performs a node discovery process comprising the above-mentioned (X) and (Y) for each address that belongs in the specified address range;

(d) the processor, in the above-mentioned (X), references a valid plugin information package selected from one or more valid plugin information packages for the specified address range, and prevents access to the node device that referenced the invalid plugin information package for the specified address range. In accordance with this, the management-target node device is the node device for which a determination has been made based on the above-mentioned selected valid plugin information package that the acquirable information is suitable. Specifically, for example, the management-target node device is the node device for which the result of the determination in either S1701 or S1702 of FIG. 17 is affirmative, and therefore the discovery is a success, and, in addition, for which a determination was made thereafter based on the above-mentioned selected valid plugin information package that the acquirable information is suitable; and (e) a node device (hereinafter, a misrecognized node device), for which a determination was made based on the above-mentioned selected valid plugin information package that the acquirable information is not suitable even though it is a node device for which discovery was a success, is not regarded as a management target. In this case, for example, the above-mentioned selected valid plugin information package is set to invalid for the part of the address range, of the above-mentioned specified address range, that comprises the address of the misrecognized node device, and node discovery processing is carried out for each of the addresses in this address range part. As a result of this, a valid plugin information package, which differs from the valid plugin information package utilized in the previous node discovery process, is used.

Furthermore, the "address" outlined above may typically be considered an IP address, but may also be a different address in a case where a communication identifier is used to access the node device. In addition, the present invention utilizes the "address range" to enhance the convenience of an auto-discovery. However, individual addresses may be used instead.

Other aspects of the specification of the subject application will become clear from the following explanation of the specification.

FIG. 2 shows the configuration of the node management apparatus 102.

The node management apparatus 102, for example, is a computer installed with software (management software) 220 for managing a node. Specifically, for example, the node management apparatus 102 comprises a storage resource 209, a communication interface device (hereinafter, the communication I/F) 203, an output device 205, an input device 207, and a processor 201 that is coupled to these elements.

The storage resource 209 is realized by one or more either the same type or different type physical storage devices (for example, a memory and/or a hard disk). The storage resource 209 stores information and the management software 220. The stored information, for example, comprises an IP address range management table 211, a login management table 212, a plugin management table 213, a discovery target management table 214, a monitoring target management table 215, and a protocol management table 216. These tables 211 through 216 will be explained below.

The communication I/F 203 is a device for communicating over the communication network 102.

The output device 205 is a display device such as a liquid crystal display, but either instead of or in addition to this display device, the output device may be of another type, such as a printer.

The input device 207 is a man-machine interface device, such as a keyboard, a mouse, or a touch panel, for receiving information input from the user. Either instead of or in addition to this, the input device 207 may be a device, such as a USB (Universal Serial Bus) port, for receiving information input from a portable storage device.

The processor 201 is typically a microprocessor. The processor 201 executes the management software 220. The management software 220 comprises a service module 221, a GUI (Graphical User Interface) module 222, and a plugin registration module 223. The service module 221 accesses the tables 211 through 216, performs node discovery processing, and monitors the monitoring-target node device. The GUI module 222 displays the GUI on the output device 205, and has the service module 221 register the information inputted to the GUI from the user in any of the tables 211 through 216. The plugin registration module 223 stores a plugin file in the storage resource 209. The plugin file, for example, is a file that is provided from the node vendor. The plugin management table 213 is updated by the service module 221 on the basis of the plugin file stored in the storage resource 209.

The respective tables 211 through 216 will be explained below.

FIG. 3A shows the IP address range management table 211.

The table 211 is a table for managing information related to the respective IP address ranges. Specifically, for example, the table 211 comprises the following information elements (1) through (5) for a single IP address range (hereinafter, called the "target IP address range" in the explanation of FIG. 3A):

(1) an ID 301, which is the identifier of the target IP address range;
(2) a start IP address 302, which is information denoting the first IP address of the target IP address range;
(3) an end IP address 303, which is information denoting the last IP address of the target IP address range;
(4) a valid login ID 304, which denotes the identifier of the valid login information for the target IP address range; and
(5) a valid plugin ID 305, which denotes the identifier of the valid plugin information package for the target IP address range.

The "login information" here is an information package comprising various information elements used when logging in to a node device. In this embodiment, the login information is information registered in one record (row) of the login management table 212. A predetermined information element (for example, ID 401) of this information may be one that is not included among the information elements comprising the login information. The login information may be a file. Furthermore, a node device login refers to carrying out an authentication process in order to use authentication information such as a user ID and/or a password for a node device to acquire information. However, there may also be cases where a node device does not have an authentication process. In a case like this, the login may be omitted.

Further, the "plugin information package" is an information package comprising definition information for plugging in a node device as a management target. In this embodiment, the plugin information package is information registered in one record (row) of the plugin management table 213. A predetermined information element of this information may not be included among the information elements comprising the plugin information package. The definition information for plugging in a node device as a management target is described in the plugin file provided by the node vendor, and the plugin information package registered in the plugin table 213 is obtained on the basis of this plugin file, but the plugin file itself may be the plugin information package instead. The plugin file will be described in detail further below.

FIG. 3B shows the login management table 212.

Respective login information is registered in the table 212. The login information, for example, comprises a login information ID 401, a protocol 302, which is information denoting a protocol, a user ID 303, and a password 404. The types of information elements included in the login information are not limited to the information elements shown in FIG. 3B. Furthermore, either a protocol or authentication information may be stored in this table.

FIG. 4A shows the plugin management table 213.

Respective plugin information packages are registered in the table 213. The plugin information package, for example, comprises a plugin information package ID (identifier) 501, definition information 502, message resource information 503, and icon resource information 504. The types of information elements included in the plugin information package are not limited to the information elements shown in FIG. 4A. Furthermore, in a case where this package is used to acquire information, the definition information of the plugin information package comprises information (node type specification information) that specifies how this node device is to be handled, i.e. what type of node device it is.

FIG. 4B shows the discovery target management table 214.

The table 214 is a table for managing information related to a node device that conforms to a discovery condition, which will be explained hereinbelow. Specifically, for example, the table 214 comprises the following information elements (1) through (6) for a single node device (hereinafter, called the "target node device" in the explanation of FIG. 4B):

(1) the IP address 601 of the target node device;
(2) a login information ID 602, which is used to log in to the target node device;
(3) a device name 603, which is information denoting the name of the target node device;
(4) a type 604, which is information denoting the type of the target node device;
(5) a status 605, which denotes whether or not information was appropriately acquired from the target node device; and
(6) a plugin information package ID 606, which constitutes the basis for the successful discovery of the target node device. The value of the status 605 may be "Success", which is a value denoting that it was possible to appropriately acquire information from the target node device, and "Error", which is a value denoting that it was not possible to appropriately acquire information from the target node device.

FIG. 5A shows the monitoring target management table 215.

The table 215 is for managing information related to each node device that is regarded as a monitoring target. Specifically, for example, the table 215 comprises the following information elements (1) through (9) for a single node device (hereinafter, called the "target node device" in the explanation of FIG. 5A):

(1) the ID 701 of the target node device;
(2) the IP address 702 of the target node device;
(3) a login information ID 703, which is used to log in to the target node device;
(4) a device name 704, which is information denoting the name of the target node device;
(5) a type 705, which is information denoting the type of the target node device;
(6) a vendor 706, which is information denoting the vendor of the target node device; and
(7) a vendor 707, which is information denoting the OS (Operating System) of the target node device;
(8) a CPU 708, which is information denoting the CPU (Central Processing Unit) of the target node device; and
(9) an ID 709 denoting the identifier of the plugin information package that is being applied to the target node device. Furthermore, in a case where this table comprises the IP address, the login ID, and the plugin ID of the node device that constitutes the management target, any data structure may be used.

FIG. 5B shows the protocol management table 216.

The table 216 is for managing information related to a plurality of protocols used in node discovery processing (Refer to FIG. 17). Specifically, for example, the table 216 comprises for each protocol a priority ranking 801, which is information denoting the priority ranking, and device type/ utilization protocol 802, which is information denoting a combination of the node device type and the protocol that is used.

The processing carried out by this embodiment may be broadly divided into two processes: node discovery and node monitoring. These processes will be explained below. Furthermore, in the following explanation, there is a GUI comprising a button, a checkbox and a radio button, but the tools for receiving a specification from the user are not limited to these, and arbitrary tools may be used. Further, in the following explanation, the plugin information package will simply be called the "plugin".

<Node Discovery>

FIG. 6 shows a discovery home GUI 601.

The GUI 601 is for specifying the auto-discovery of a node device 101. The GUI module 222 of the management software 220 displays the GUI 601.

The GUI 601, for example, comprises the following elements (1) through (5):

(1) a button 611 for adding an IP address range;
(2) a list 612 of IP address ranges;
(3) a button 613 for adding login information;
(4) a list 614 of login information; and
(5) a button 615 for specifying the execution of an auto-discovery.

The list 612 is displayed on the basis of the IP address range management table 211 (Refer to FIG. 3A). The list 612 comprises for each IP address range a checkbox for specifying whether or not a selection will be made, a button for specifying the deletion of information related to an IP address range, and a button 617 for specifying the updating of information related to an IP address range. The user, by referencing this list 612, is able to discern the respective IP address ranges that are currently registered, and the login information and plugin that are deemed valid for each IP address range.

The list 614 is displayed on the basis of the login management table 212 (Refer to FIG. 3B). The list 614 comprises for each login information a button for specifying the deletion of the login information, and a button 619 for specifying the updating of the login information. The user, by referencing this list 614, is able to discern the respective login information that is currently registered.

<<IP Address Range, Plugin Valid/Invalid, and Logon Information Valid/Invalid Settings>>

Figure 7:
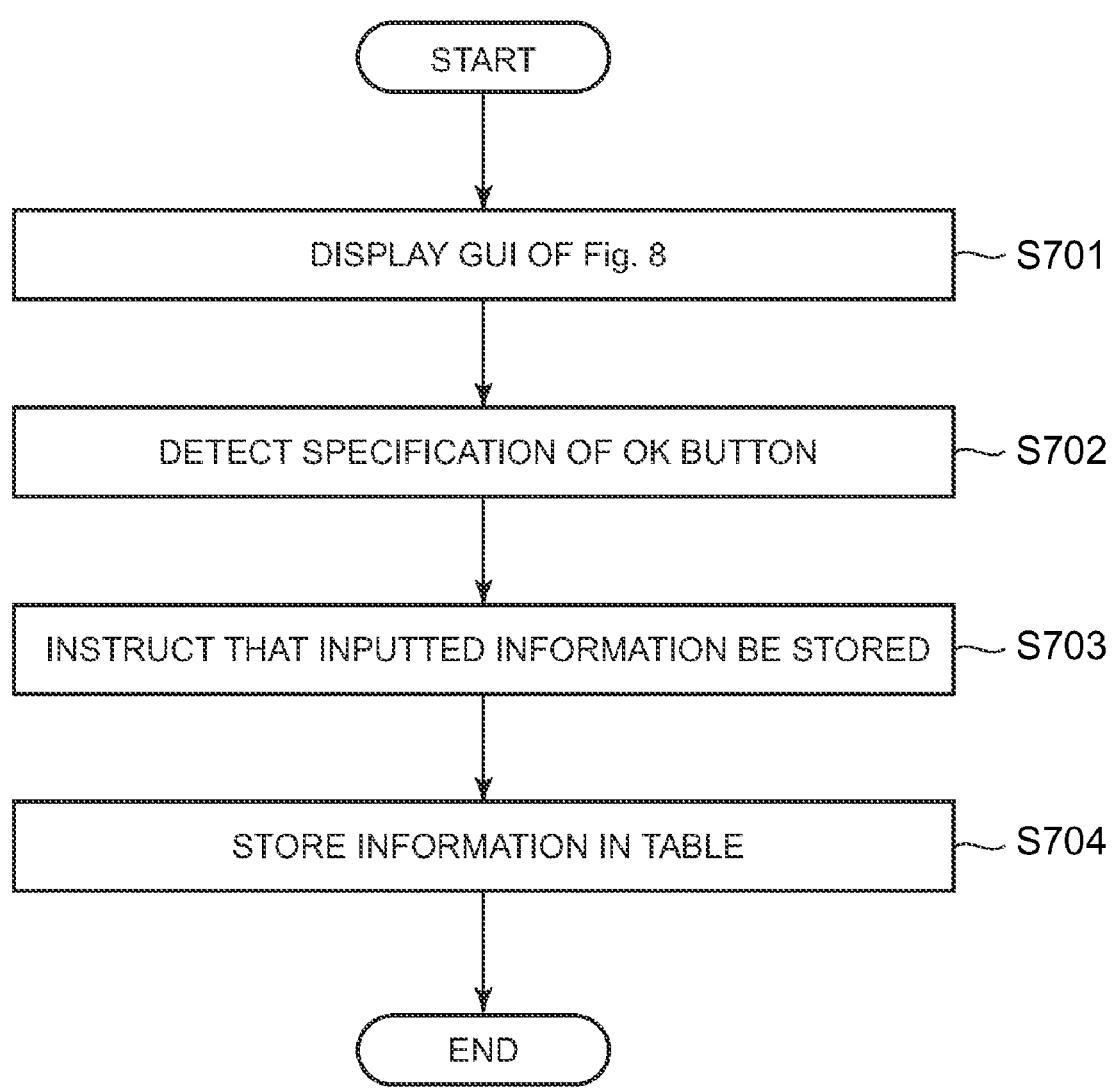
FIG. 7 shows the flow of processing for setting an IP address range, valid/invalid login information, and a valid/invalid plugin.

Prior to starting a node auto-discovery, it is possible set the IP address range setting, the plugin valid/invalid setting, and the login information valid/invalid setting. For example, in a case where the GUI module 222 receives a signal in accordance with either the button 611 in the GUI 1701 shown in FIG. 6 or the button 617 corresponding to any IP address range having been pressed, the processing shown in FIG. 7 is executed.

That is, the GUI module 222 displays the address setting GUI 1701 shown in FIG. 8 (S701). The GUI 1701 comprises the following elements (1) through (6):

(1) a range name (IP address range ID) input column 1711;
(2) IP address range (the start IP address and the end IP address) input columns 1712 and 1713;
(3) a selection tool (for example, a radio button) 1714 related to the login information for the inputted IP address range;
(4) a list 1715 of all the login information IDs 401 registered in the login management table 212;
(5) a selection tool (for example, a radio button) 1716 related to the plugin for the inputted IP address range; and
(6) a list 1717 of all the plugin IDs 501 registered in the plugin management table 213.

The selection tool 1714 comprises a first selection option "All", and a second selection option "Select". The "ALL" is selected in a case where all of the login information corresponding to all of the IDs included in the list 1715 are valid. The "Select" is selected in a case where at the least one of all the login information for the inputted IP address range is invalid (login information that is deemed invalid is not used in the node discovery process for the inputted IP address range). In a case where "Select" is selected, the user enters a check mark in the check mark corresponding to login information deemed valid from among the check marks corresponding to the respective IDs in the list 1715.

The selection tool 1716 comprises a first selection option "All", a second selection option "Select" and a third selection option "Do not use". The "ALL" is selected in a case where all of the plugins corresponding to all of the IDs included in the list 1716 are valid. The "Select" is selected in a case where at the least one of all the plugins for the inputted IP address range is invalid. In a case where "Select" is selected, the user enters a check mark in the check mark corresponding to a plugin that is deemed valid from among the check marks corresponding to the respective IDs in the list 1716. A plugin that is deemed invalid is not used in the node discovery process for the inputted IP address range. In a case where "Do not use" is selected, none of the plugins is used in the node discovery process for the inputted IP address range. Furthermore, in a case where a plugin is not used, the management software 220 accesses the node device 101 in accordance with a predefined (embedded) information collection method. This collection method will be called the "generic collection method" below.

In a case where the "OK" button 1718 inside the GUI 1701 is pressed by the user, the GUI module 222 detects that this button 1718 has been pressed (S702). Then, the GUI module 222 instructs the service module 221 to register the information that was inputted into the GUI 1701 (S703). In response to this instruction, the service module 221 stores the information that was inputted into the GUI 1701 in the IP address range management table 211 (S704).

<<Login Information Setting>>

Figure 9:
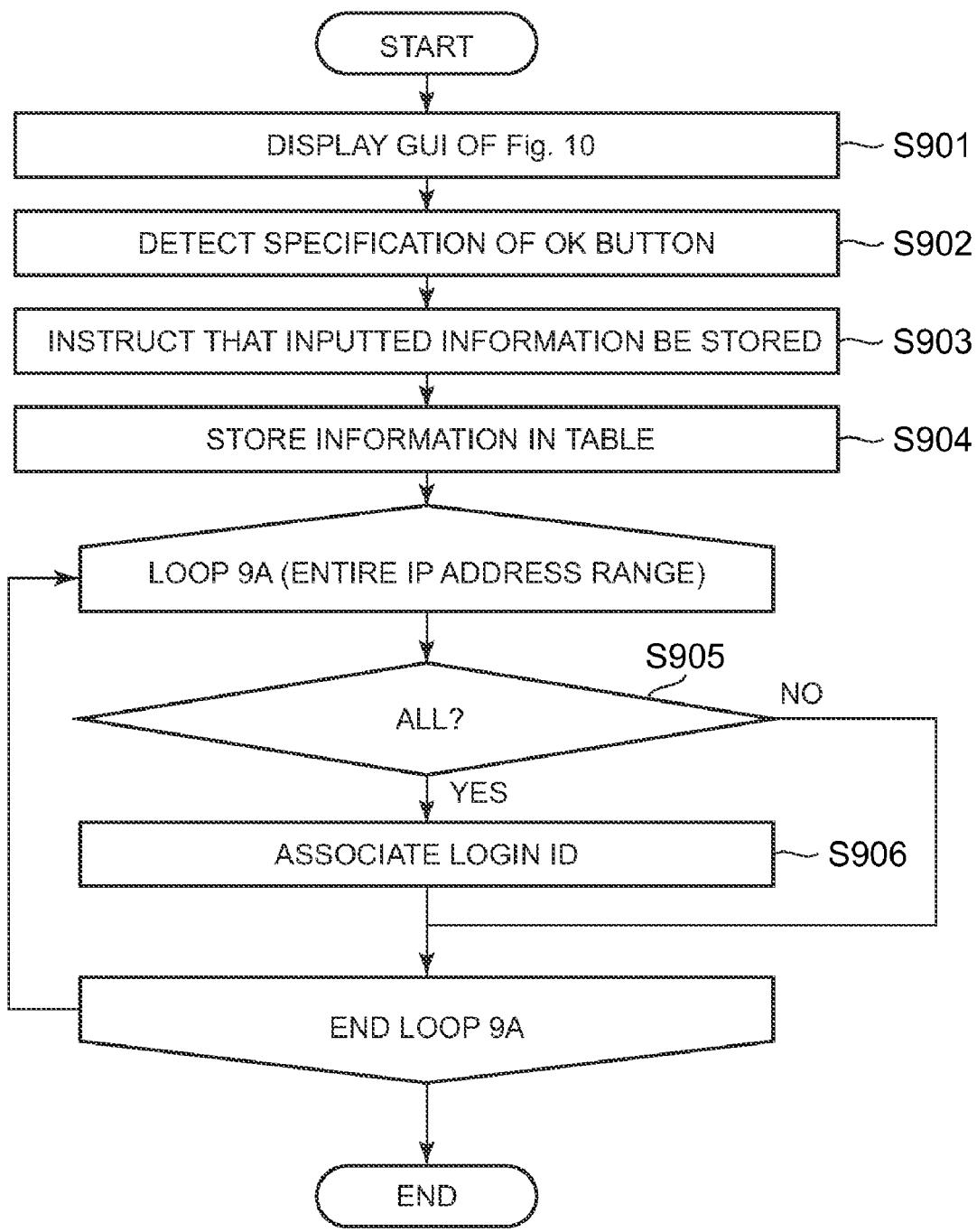
FIG. 9 shows the flow of processing for registering login information.

It is possible to set the login information prior to the start of a node auto-discovery. For example, in a case where the GUI module 222 receives a signal to the effect that either the button 613 in the GUI 1701 shown in FIG. 6 or the button 619 corresponding to any login information has been pressed, the processing shown in FIG. 9 is executed.

Figure 10:
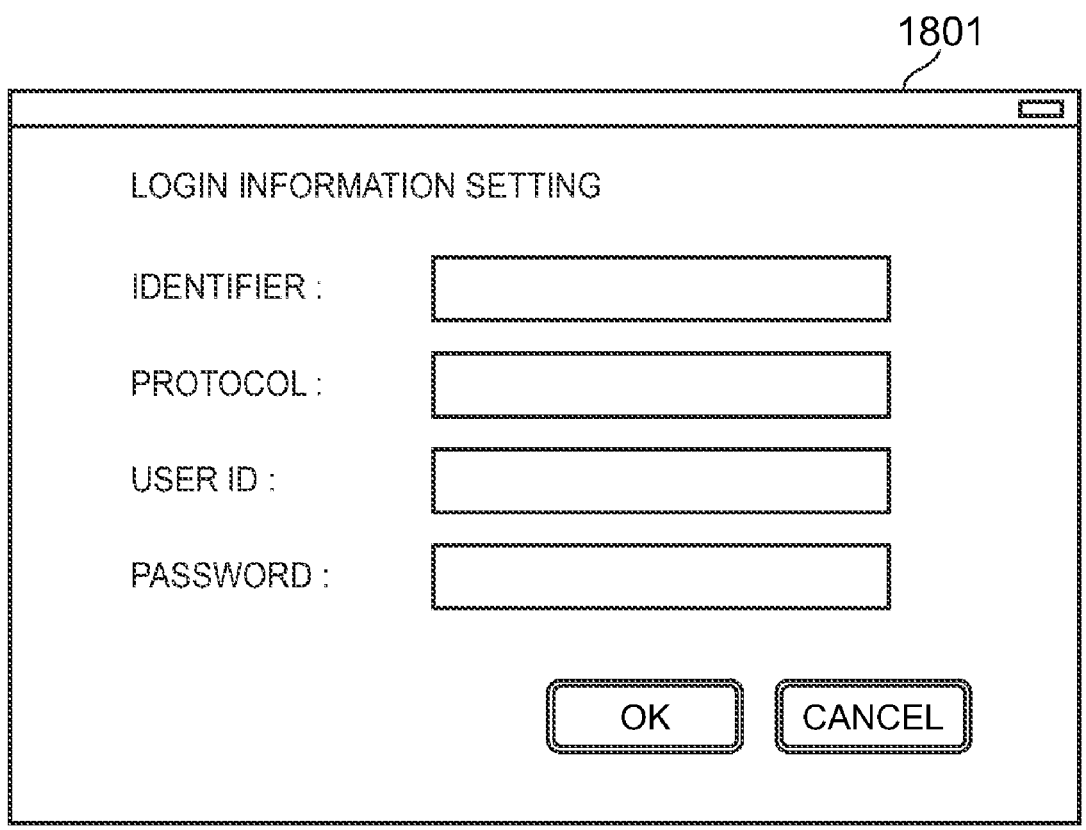
FIG. 10 shows a login setting GUI 1801.

That is, the GUI module 222 displays the login setting GUI 1801 shown in FIG. 10 (S901). The GUI 1801 comprises input fields for an identifier, protocol information, a user ID, and a password.

In a case where the user presses the "OK" button inside the GUI 1801, the GUI module 222 detects the fact that this button was pressed (S902). Then, the GUI module 222 instructs the service module 221 to register the information that was inputted into the GUI 1801 (S903). In response to this instruction, the service module 221 stores the information inputted into the GUI 1801 in the login management table 212 (Refer to FIG. 3B) (S904).

The service module 221, in a case where the valid login ID is "All" (S905: YES) for the respective IP address ranges registered in the IP address range management table 211, associates the login ID included in the information that was stored in S904 with the IP address range (S906).

<<Plugin Setting>>

It is possible to set the plugin on the basis of the plugin file prior to the start of a node auto-discovery.

Figure 11:
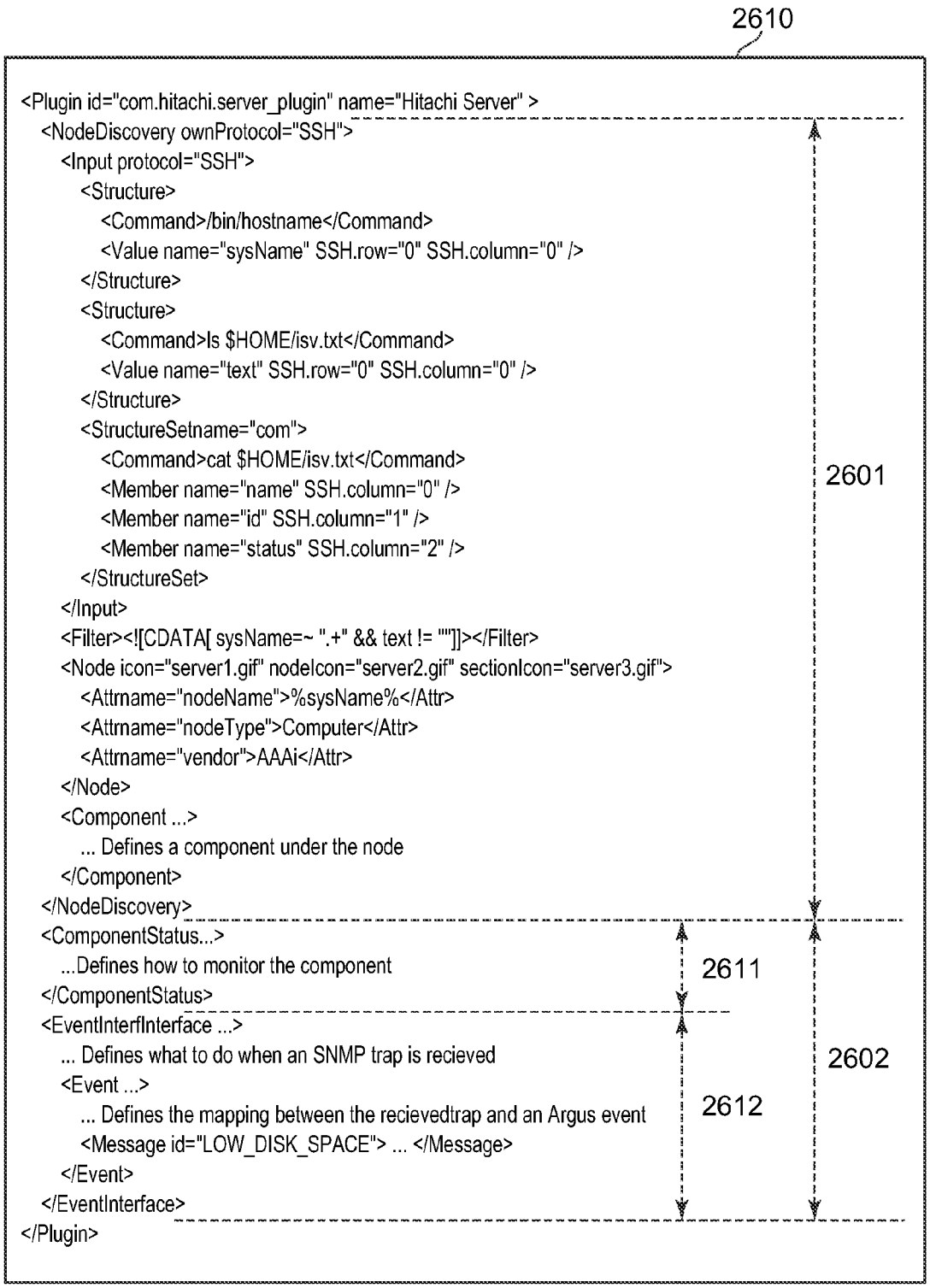
FIG. 11 shows a plugin file.

FIG. 11 shows a plugin file.

The plugin file 2610, for example, is created using a structured tag language (for example, XML (eXtensible Markup Language)). The plugin file 2610 comprises a plugin ID, node discovery definition information 2601, and node monitoring definition information 2602.

The plugin ID is described inside the route tag (the tag comprising the Plugin id).

The node discovery definition information 2601 is information denoting a definition related to the node device discovery method. The node discovery definition information 2601, for example, comprises support protocol information, utilization protocol information, condition information, node creation information, and component creation information.

The support protocol information is information denoting one or more types of protocols (hereinafter, support protocol). According to the example of FIG. 11, the SSH of "ownProtocol='SSH'" corresponds to the support protocol. For example, the type of the support protocol may be the same as the type of the utilization protocol described hereinbelow, or may be more types than the utilization protocol.

The utilization protocol information is information denoting the protocol that is used when information is acquired from the node device. According to the example of FIG. 11, the SSH of the "input protocol='SSH'" corresponds to the utilization protocol. That is, in the example of FIG. 11, the support protocol type and the utilization protocol type are the same.

The condition information comprises information denoting a condition related to the information acquired from the node device. According to the example of FIG. 11, the condition information is the information described between <Filter> and </Filter>. This information, for example, comprises an item of information (for example, a vendor name or a product name) to be acquired.

The node creation information is information denoting the node creation method. According to the example of FIG. 11, the node creation information is the information described between the <Node icon=> and </Node>. This information, for example, comprises an attribute (for example, a node name, a node type, and a vendor name) retained as a node (information) to be created.

The component creation information is information denoting the component (software component) creation method. According to the example of FIG. 11, the component creation information is the information described between the <Component> and the </Component>. The component is created under the created node.

The node monitoring definition information 2602 is information denoting a definition related to the node device monitoring method. The node monitoring definition information 2602 comprises component status information 2611 and event interface information 2612.

The component status information 2611 is information related to the definition of a method for regularly updating the status of a component. According to the example of FIG. 11, this information 2611 is the information described between the <ComponentStatus> and the </ComponentStatus>.

The event interface information 2612 is information denoting the definition for updating a component status and issuing an event in accordance with receiving a SNMP trap. According to the example of FIG. 11, this information 2612 is the information described between the <EventInterface> and the </Event Interface>.

The preceding has been an explanation of the plugin file 2610. Furthermore, this plugin file 2610 may be associated with another file. For example, a message resource file, in which is stored a message that is outputted in a case where an event is detected during monitoring, and an icon resource file, in which is stored information denoting an icon displayed on the GUI, may be associated with the plugin file.

A node discovery process is carried out based on node discovery information 2601. Specifically, for example, the management software 220 carries out discovery processing with respect to an unconfirmed IP address based on the node discovery information 2601. In a case where the discovery condition is a match, the management software creates a node and a component based on the above-mentioned node creation information and component creation information.

After a discovered node device has been made the monitoring target, the management software 220 regularly collects information from the above-mentioned created component based on the component status information 2611. The management software 220 determines whether or not the collected information conforms to the condition defined by the component status information 2611, and based on the result of this determination, updates the status of the component.

Further, the management software 220 issues an event based on the event interface information 2612. The event, for example, is issued when either of the following two conditions (C1) or (C2) has been satisfied:

(C1) a SNMP trap is received from the node, and the SNMP trap satisfies the condition for issuing an event; or (C2) the post-update status of the component satisfies the condition for issuing an event. Furthermore, in a case where a SNMP trap has been received, it is not only possible to issue an event, but the status of the component may also be updated.

Figure 12:
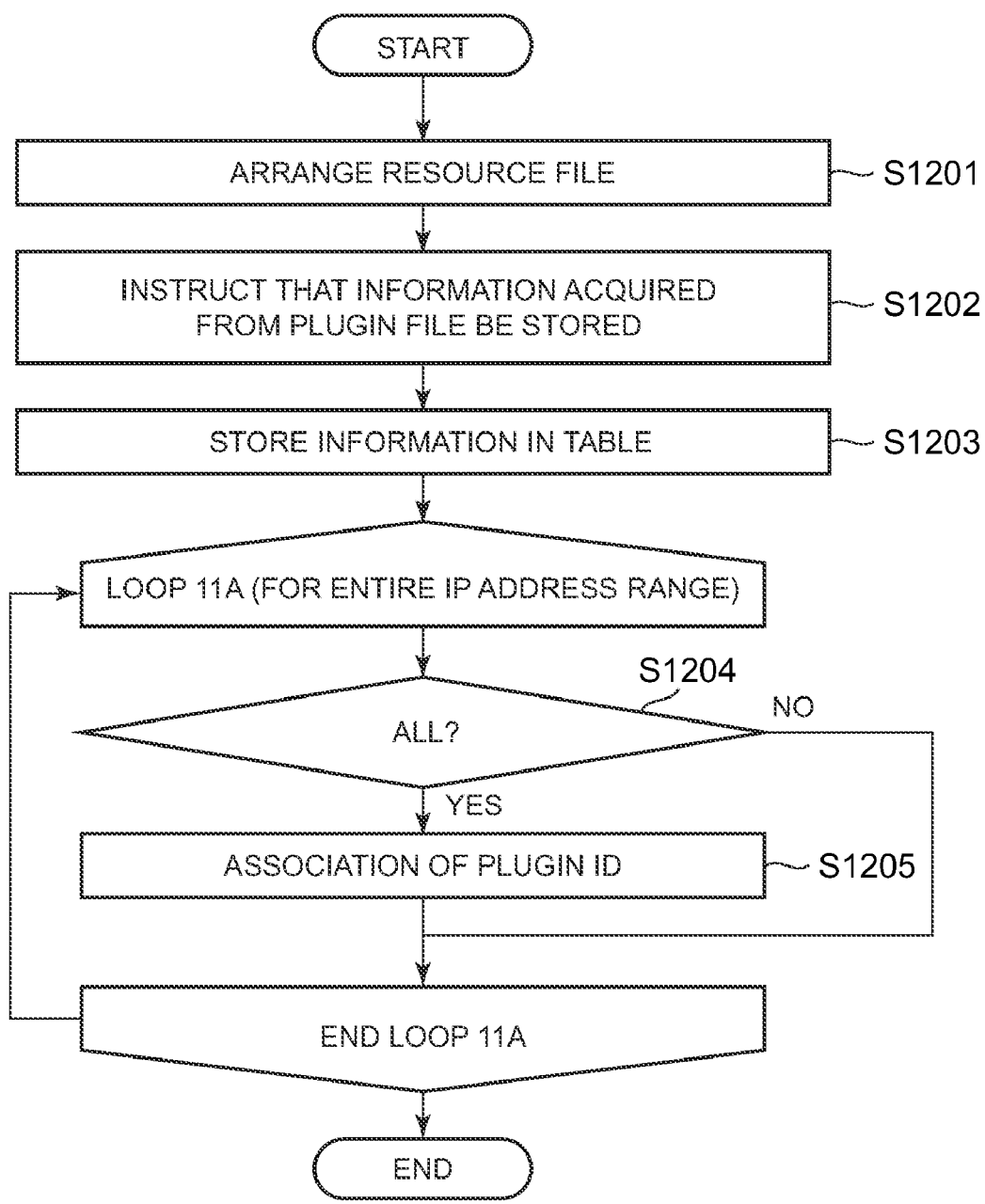
FIG. 12 shows the flow of processing for registering a plugin information package.

The information described in the above-mentioned plugin file, for example, is stored in the plugin management table 213 (refer to FIG. 4A) by the plugin registration module 223 using the flow of processing shown in FIG. 12 in a case where this module 223 has received a start instruction from a plugin installer (a computer program) not shown in the drawing.

That is, the plugin registration module 223 arranges the resource file that is associated with the target plugin file in a specified storage area (S1201). Then, the module 223 acquires information from the above-mentioned plugin file, and instructs the service module 221 to register the acquired information (S1202). The service module 221 stores the information acquired from the plugin file in the plugin management table 213 in response to this instruction (S1203).

The service module 221, in a case where the valid plugin ID is "All" for the respective IP address ranges registered in the IP address range management table 211 (S1204: YES), associates the plugin ID included in the information stored in S1203 with the IP address range (S1205).

As mentioned above, it is possible to set the IP address range, which plugin and login information are valid/invalid with respect to this IP address range, the login information, and the plugin prior to starting a node discovery.

Further, according to the address setting GUI 1701 shown in FIG. 8, it is possible to set plugin and login information to valid/invalid with respect to the inputted IP address range.

Figure 13:
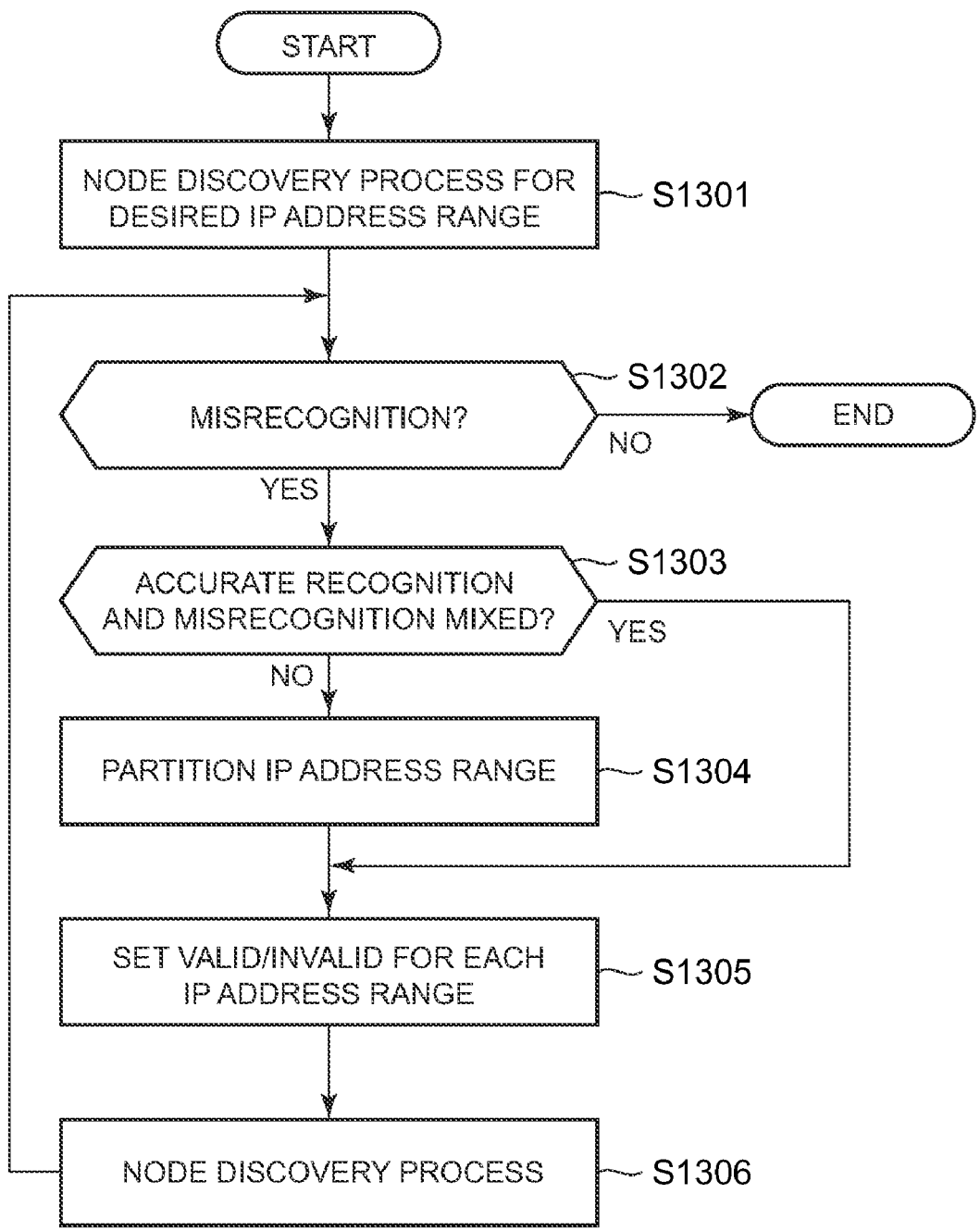
FIG. 13 shows the overall flow of processing for node discovery.

Accordingly, it is possible to use the flow of processing shown in FIG. 13, for example, as the overall flow of node discovery.

First, node discovery processing is carried out for each address on a user-desired IP address range in S1301.

In the node discovery process, in a case where a node device conforms to a predetermined discovery condition, the node device discovery is a success, but there is a possibility that any of the discovered plurality of node devices is a node device that was misrecognized (hereinafter, a misrecognized node device) as will be explained below.

Accordingly, the presence or absence of a misrecognized node device is determined in S1302. This determination may be performed by the user, or may be carried out by the management software 220.

In a case where the result of the determination of S1302 is negative (S1302: NO), the node discovery ends.

Thereafter, for example, in a case where the discovered node device is set as the monitoring target, monitoring is carried out with respect to the monitoring-target node device.

In a case where the result of the determination of S1302 is affirmative (S1302: YES), S1303 is carried out. That is, a determination is made as to whether or not a correctly recognized node device and a misrecognized node device are mixed together in the discovered node devices. This determination, too, may be performed by the user or may be carried out by the management software 220. In a case where the result of the determination of S1303 is affirmative (S1303: YES), S1304 through S1306 are carried out, and in a case where the result of the determination of S1303 is negative (S1303: NO), S1305 and S1306 are carried out without carrying out S1304.

The IP address range specified by the immediately previous node discovery is partitioned in S1304 (S1304). Specifically, at the least the IP address range part that comprises the IP address of a misrecognized node device is set from this IP address range. Incidentally, the IP address range comprises a plurality of IP addresses, and a part of an IP address range comprises two or more IP addresses.

In S1305, the plugin that sets the IP address range part (the IP address range) to valid/invalid is set. The plugin that constitutes the reason for the misrecognition is set to invalid here. Two or more plugins will be set to invalid in a case where IP addresses of a plurality of misrecognized node devices are respectively included in the IP address range part (the IP address range), and, in addition, the plugin that constitutes the reason for the misrecognition is different for each misrecognized node device.

In S1306, node discovery processing is carried out once again in accordance with the settings in S1305.

All of the steps from S1301 through S1306 may be carried out by the management software 220. For example, the management software 220 carries out S1301 at a predetermined time. In a case where a misrecognized node device is found (S1302: YES, and S1303: YES), the management software 220 sets the IP address range part comprising the IP address of the misrecognized node device (for example, the IP address range part comprising a prescribed range that has the IP address of the misrecognized node device as the criterion) in accordance with a prescribed rule (S1304). Then, the management software 220 sets the plugin, which is the cause of the misrecognition, to invalid for this IP address range part (S1305). Thereafter, the management software 220 carries out S1306.

The flow of processing in a node discovery will be explained in detail below.

Figure 14:
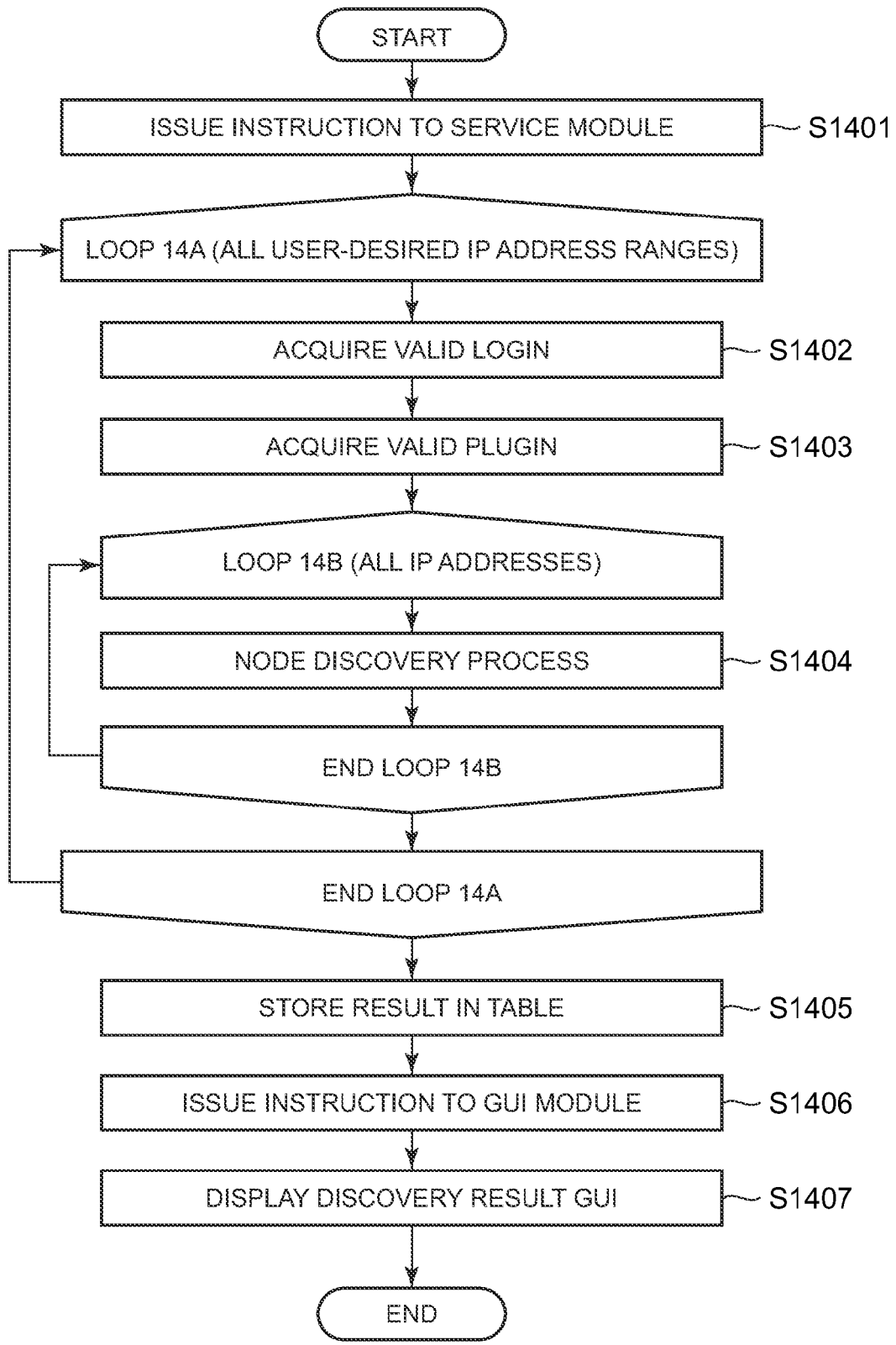
FIG. 14 shows the flow of processing carried out in a case where a user manually specifies the start of a node discovery.

FIG. 14 shows the flow of processing carried out in a case where node discovery start is specified manually by the user.

For example, in a case where the button 615 on the GUI 601 shown in FIG. 6 is specified, in S1401 the GUI module 222 sends the service module 221 information (the start IP address, the end IP address, the valid login ID, and the valid plugin ID) related to the IP address range selected by the user using the list 612, and, in addition, issues a node discovery instruction to the service module 221.

S1402 through S1404 are carried out for all the IP address ranges selected by the user. A single IP address range will be given as an example below (hereinafter called the "target IP address range" in the explanations of FIG. 14 and FIG. 17).

In S1402, the service module 221 uses the valid login ID for the target IP address range to acquire the login information to be specified. In a case where the valid login ID is "All", all the login information corresponding to all the associated login IDs are acquired.

In S1403, the service module 221 uses the valid plugin ID for the target IP address range to acquire the plugin to be specified. In a case where the valid plugin ID is "All", all of the plugins corresponding to all the associated plugin IDs are acquired.

Node discovery processing (S1404) is performed for all the IP addresses that belong to the target IP address. Node discovery processing will be explained in detail below by referring to FIG. 17.

In S1405, the service module 221 stores the information denoting the result of the node discovery processing with respect to all the IP addresses in the discovery target management table 214 (refer to FIG. 4B).

In S1406, the service module 221 instructs the GUI module 222 to display the discovery result.

In S1405, the GUI module 222 displays a discovery result GUI based on the discovery target management table 214.

Figure 15:
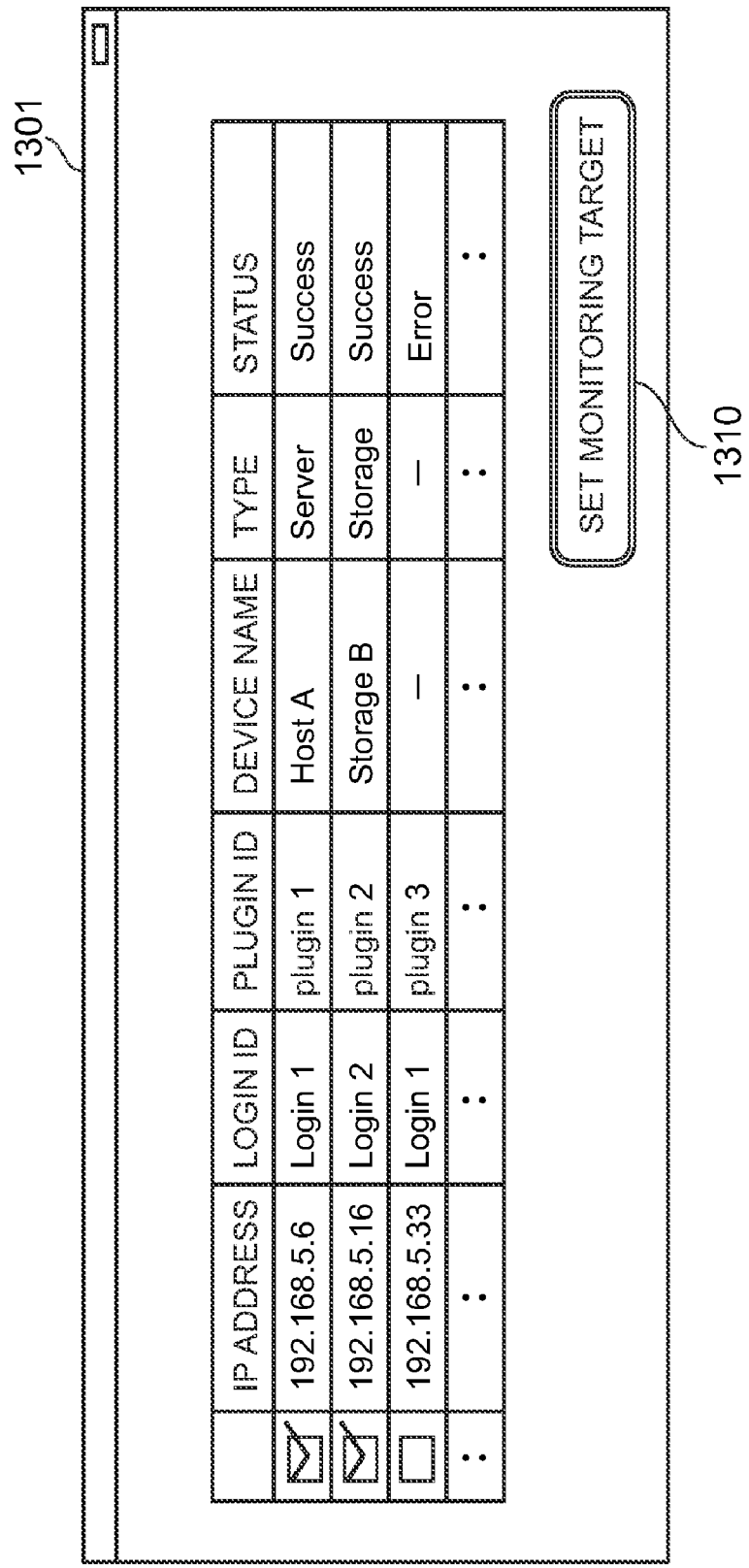
FIG. 15 shows a discovery result GUI 1301.

FIG. 15 shows the discovery result GUI 1301.

The information that is registered in the discovery target management table 214 is displayed on the GUI 1301. That is, the IP address, the login ID, the plugin ID, and the device name are displayed for each node device for which discovery was a success. The login ID is the ID of the login information utilized in the node discovery process (the login information used to log in to the discovered node device). The plugin ID is the ID of the plugin utilized in the node discovery process.

As mentioned above, the status values of a discovered node device are "Success" and "Error". Whether the status of the discovered node device is "Success" or "Error" is determined based on various aspects, for example, the following aspects (1) and/or (2):

(1) whether or not it was possible to acquire a predetermined information item during the node discovery process; and (2) whether or not it was possible to acquire a predetermined information item from the node device based on the node monitoring definition information described in the plugin. In a case where the user makes a determination with respect to the node device, for example, the status value of the node device for which the discovery was a success is initially "Success", and thereafter, the user may determine whether or not each node device is a misrecognized node device, and manually change the status from "Success" to "Error" for a node device that is determined to be a misrecognized node device.

Figures 18A, 18B, 18C:
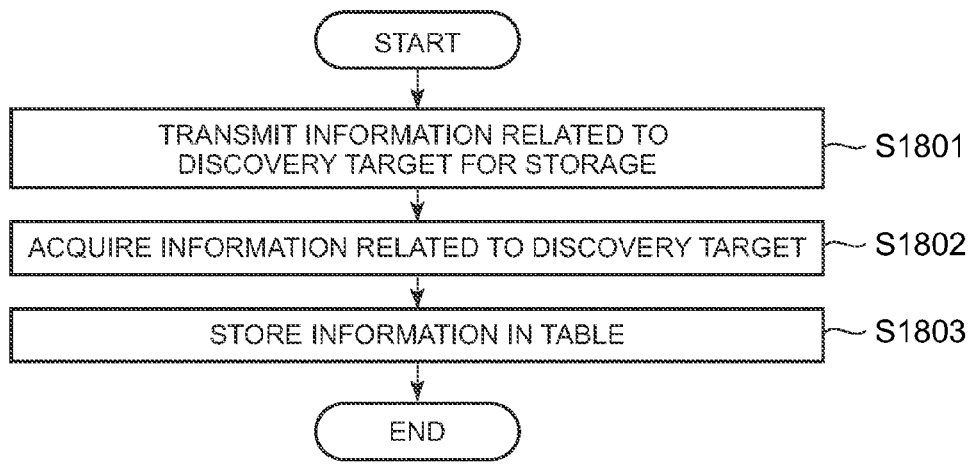
FIG. 18A shows the flow of processing up until a discovered node device is made a monitoring target.
FIG. 18B shows an example of the relationship between a valid plugin and an IP address range prior to a misrecognized node device being found.
FIG. 18C shows an example of the relationship between a valid plugin and an IP address range subsequent to a misrecognized node device having been found.

In a case where the node device, which is to be the monitoring target, is displayed in the discovery result GUI 1301, the user specifies the button 1310 by selecting (entering a check mark in the checkbox corresponding to the node device) the desired node device from the "Success" node devices. In accordance with this, as shown in FIG. 18A, the GUI module 222 sends the service module 221 information related to the selected node device, and, in addition, instructs the service module 221 to store the information (S1801). The service module 221 uses this information to acquire the information related to the selected node device from the discovery target management table 214 (S1802) and stores this information in the monitoring target management table 215 (S1803).

Figure 16:
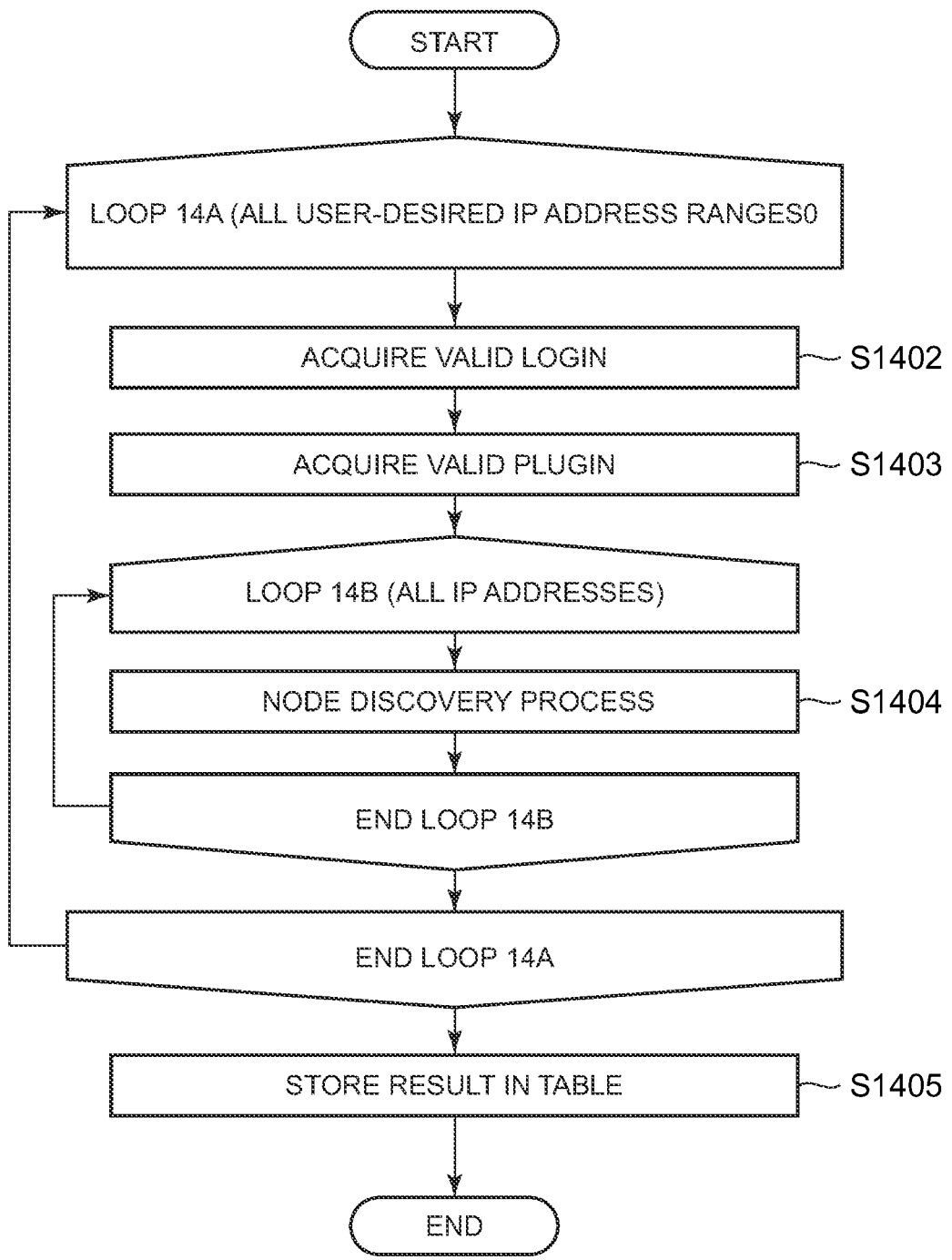
FIG. 16 shows the flow of processing carried out in a case where a node discovery is started in accordance with an auto-discovery schedule.

FIG. 16 shows the flow of processing carried out in a case where a node discovery is started in accordance with an auto-discovery schedule.

The trigger for starting a node discovery is not limited to a manual specification from the user, and a trigger that accords with a pre-registered schedule may also be used. In FIG. 16, the same step numbers (reference signs) are assigned to the same processes as those in the flow of processing shown in FIG. 14. Therefore, according to FIG. 16, although S1402 through S1405 are carried out the same as in FIG. 14, S1401, S1406 and S1407 are not carried out.

FIG. 17 shows the flow of node discovery processing.

The service module 221 references the protocol management table 216, and carries out S1701 and S1702 in descending order of priority for all the protocols registered in this protocol management table 216 (Loop 17A). The explanation will continue below by taking a single protocol (called the "target protocol" in the explanation of FIG. 17) as an example.

The service module 221 carries out S1701 for all the plugins (hereinafter, the specified valid plugin) for which the target protocol is the support protocol from among all the valid plugins corresponding to the target IP address range (Loop 17B). The explanation will continue below by taking a single specified valid plugin (called the "target plugin" in the explanation of FIG. 17) as an example.

The service module 221 carries out S1701 for the login information (hereinafter, the specified valid login) comprising protocol information denoting the target protocol from among all the valid login information corresponding to the target IP address range (Loop 17C). The explanation will continue below by taking a single specified valid login (called the "target login" in the explanation of FIG. 17) as an example.

In S1701, the service module 221, based on one IP address from among the target IP address range, the target login, and the target plugin, accesses the target node device comprising this IP address (hereinafter the target node device). The service module 221 determines whether or not the result of this access satisfies the discovery condition.

For example, in a case where the login to the target node device using the target login failed, the service module 221 carries out S1701 once again utilizing a different specified valid login. In a case where the login using the target login was a success, the target login is the login information utilized in the node discovery process.

The service module 221 also accesses the target node device based on the node discovery definition information inside the target plugin subsequent to a successful login. Specifically, for example, the service module 221 accesses the target node device using the utilization protocol (Input protocol) and acquires information from the target node device. The service module 221 determines that the discovery condition is satisfied in the case of (1) and (2) below:

(1) a response is obtained from the target node device; and
(2) the information acquired from the target node device using the utilization protocol conforms to the condition (the condition specified by the Filter tag) denoting the condition information inside the target plugin (for example, the item of acquired information matches the item of information defined in the condition). In accordance with this, the discovery with respect to the target node device is a success. Alternatively, in a case where the above-mentioned either (1) or (2) is not satisfied, a determination is made that the discovery condition has not been satisfied. In accordance with this, S1701 is carried out once again based on a different specified valid plugin.

After loops 17B and 17C have ended, the service module 221 carries out S1702 for all the specified valid logins of all the valid login information corresponding to the target IP address range (Loop 17D). The explanation will continue below by taking a single specified valid login (called the "target login" in the explanation of FIG. 17) as an example.

In S1702, the service module 221 accesses the target node device on the basis of one IP address of the target IP address range, the target login, and the above-mentioned generic collection method. The service module 221 determines whether or not a response to this access was received. Incidentally, the generic collection method, as described above, is a pre-determined information collection method that is not based on the plugin.

For example, in a case where the login to the target node device using the target login failed, the service module 221 carries out S1702 once again using a different specified valid login. In a case where the login using the target login was a success, the target login is the login information used in the node discovery process.

The service module 221 also accesses the target node device in accordance with the generic collection method using the target protocol subsequent to a successful login. The service module 221 determines whether or not a response to this access was obtained. In a case where a response was obtained, the discovery of the target node device is a success.

According to the node discovery process above, the valid plugin, which constitutes the basis of a successful target node device discovery, is the plugin that was utilized (the applied plugin), and once a discovery is a success, no other valid plugin is tried for the target node device (the same is also true for login information).

Subsequent to node discovery processing having been carried out for each IP address belonging to the respective user-desired IP address ranges, a determination is made as to whether or not the node device for which discovery was a success is a misrecognized node device. This determination, as mentioned above, may be made by the user or may be carried out by the management software 220.

One reason that node device misrecognition may occur is that the discovery of a target node device is able to succeed even with an inappropriate valid plugin. The reasons that an inappropriate valid plugin can be selected are that a plurality of valid plugins exist for a single node device, and that the discovery condition information of the respective plugins is not necessarily complete.

That is, misrecognition occurs in a case where a valid plugin other than the appropriate plugin is set for the node device, and this node device conforms to the discovery condition of this plugin.

In a case where a misrecognized node device is discovered, as was explained by referring to FIG. 13, the partitioning of the IP address range is carried out. Specifically, the IP address range part that comprises the IP address of the misrecognized node device is set from the specified IP address range. The setting of the IP address range part may be performed by the user or maybe carried out by the management software 220. For example, the management software 220, in accordance with a predetermined rule (for example, a rule called "Setting the IP address range part comprising the IP address of a predetermined range that includes the IP address of the misrecognized node device"), sets the IP address range part that comprises the IP address of the misrecognized node device.

Then, the plugin that was the cause of the misrecognition is set to invalid for the IP address range part. This, too, may be performed by the user or may be carried out by the management software 220.

For example, it is supposed that the relationship between the IP address range and the valid plugin prior to the misrecognized node device being discovered is as shown in FIG. 18B. Then, it is supposed that the IP address of the misrecognized node device is "192:168:0:75", and that the plugin that caused the misrecognition was "Plugin 2".

In this case, for example, the original IP address range "192:168:0:00 through 192:168:0:101" is partitioned into a first IP address range part and a second IP address range part as shown in FIG. 18C. The first IP address range part is the IP address range part "192:168:0:51 through 192:168:0:101", which comprises the IP address "192:168:0:75" of the misrecognized node device. The second IP address range part is the part other than the first IP address range part of the original IP address range. Of the plugins "Plugin 1", "Plugin 2" and "Plugin 3" that were valid for the original IP address range, the valid plugin that was the cause of the misrecognition, i.e., "Plugin 2", is set to invalid for the first IP address range part. In accordance with this, since the plugin "Plugin 2", which constituted the cause of the misrecognition, is not used in node discovery processing for the first IP address range part, the previously misrecognized node device can be counted on to be correctly recognized this time.

<Node Monitoring>

As described hereinabove, the user-desired node device is made the monitoring-target node device from among the correctly recognized node devices (the node device with a status of "Success"). Or, the correctly recognized node device is automatically made the monitoring-target node device by the management software 220.

Figure 19:
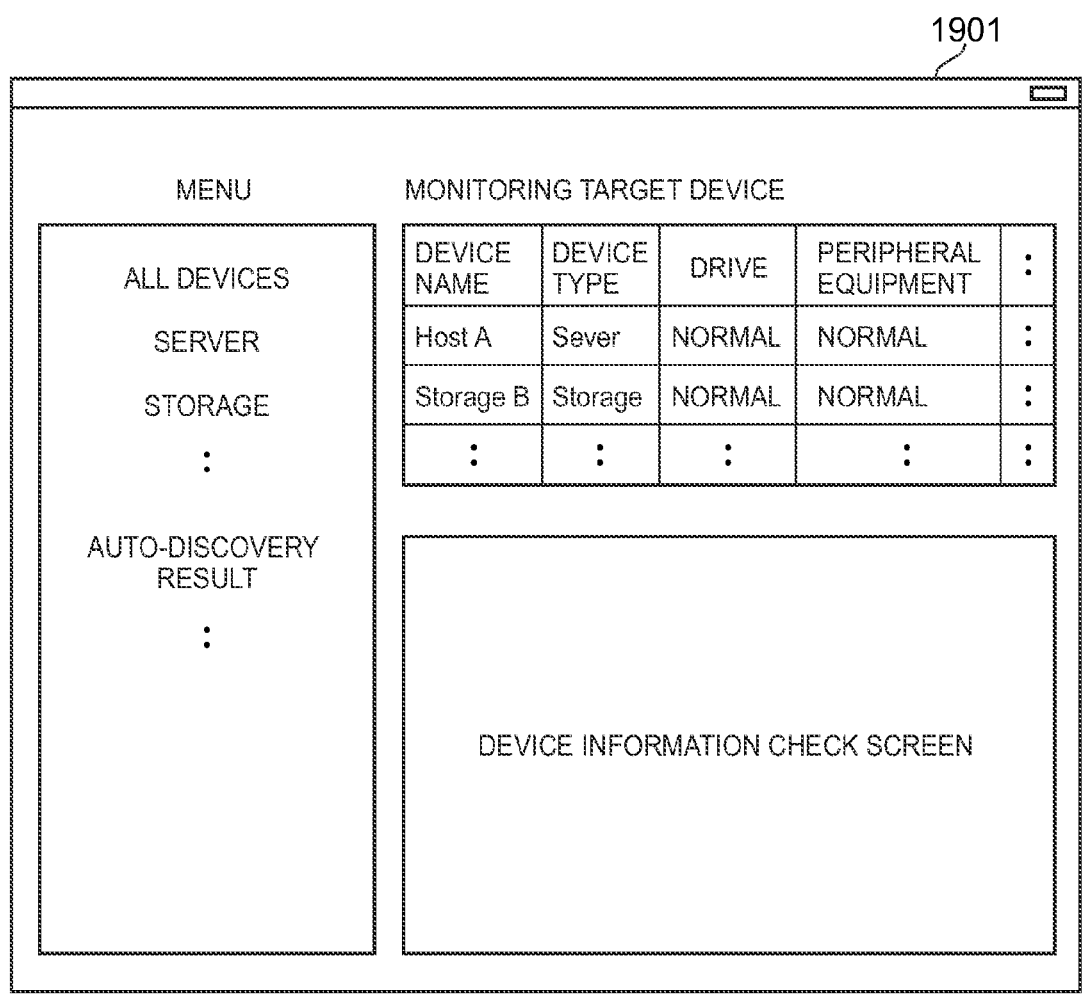
FIG. 19 shows a monitoring home GUI.

FIG. 19 shows the monitoring home GUI 1901.

The GUI 1901 is for confirming the information related to the monitoring-target node device. The GUI 1901 is displayed by the GUI module 222. A table in which is displayed various information related to the monitoring-target node device is displayed in the GUI 1901, but this table is displayed based on the monitoring target management table 215.

Figure 20:
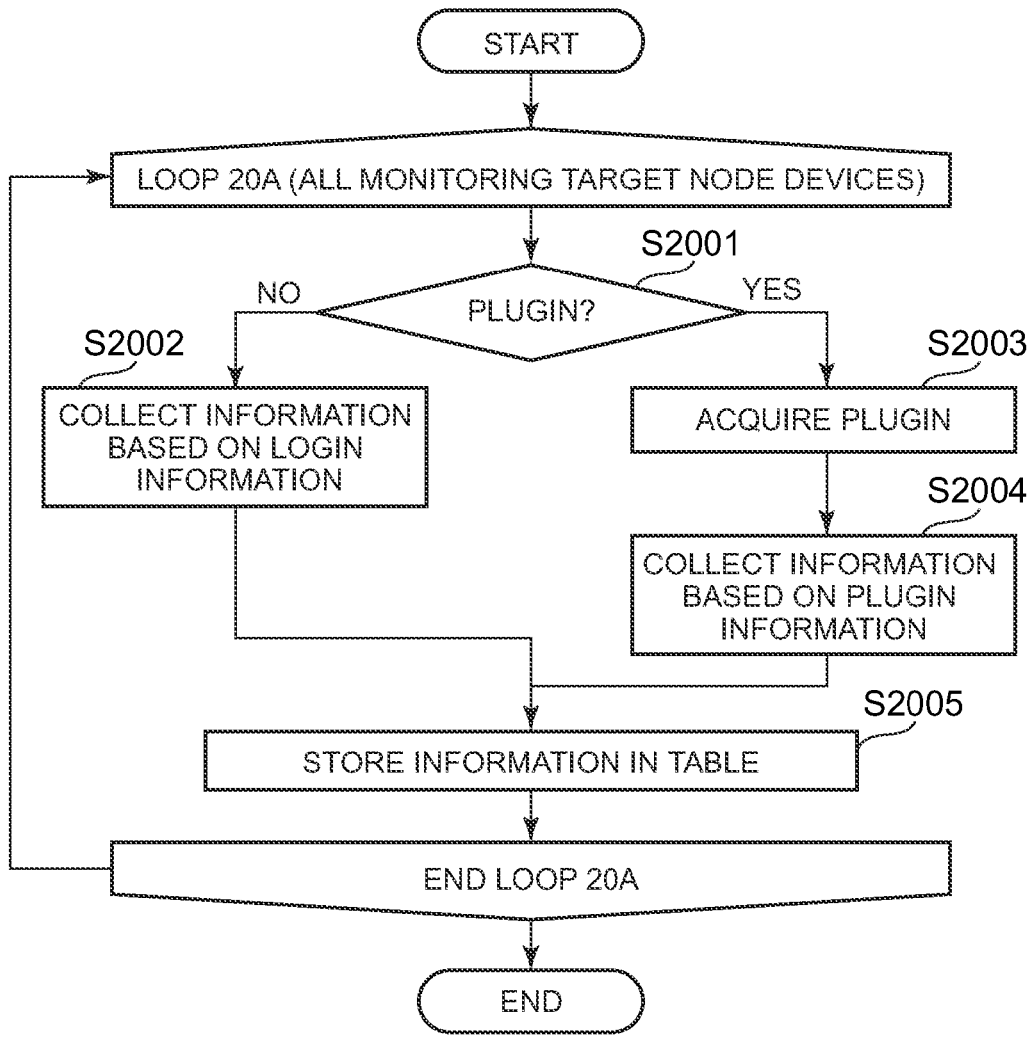
FIG. 20 shows the flow of a node monitoring process.

FIG. 20 shows the flow of a node monitoring process.

S2001 through S2005 are carried out for all monitoring-target node devices. S2001 through S2005 will be explained below by taking a single node device (called the "target node device" in the explanation of FIG. 20) as an example.

In S2001, the management software 220 references the monitoring target management table 215, and determines whether or not there is an applicable plugin for the target node device. In a case where the result of this determination is negative (S2001: NO), S2002 is carried out, and in a case where the result of this determination is affirmative (S2001: YES), S2003 is carried out.

In S2002, the management software 220 references the monitoring target management table 215, and specifies the applicable login information for the target node device. Then, based on the applicable login information (for example, using the protocol specified in this package), the management software 220 collects information from the target node device.

In S2003, the management software 220 references the monitoring target management table 215, specifies the applicable plugin for the target node device, and acquires the specified applicable plugin.

In S2004, the management software 220 collects information from the target node device based on the applicable plugin (for example, based on the node monitoring definition information 2602 inside the applicable plugin). Specifically, for example, the management software 220 collects the information from the component created when discovery succeeded.

In S2005, the management software 220 stores the information collected in either S2002 or S2004 in the monitoring target management table 215.

Figure 21:
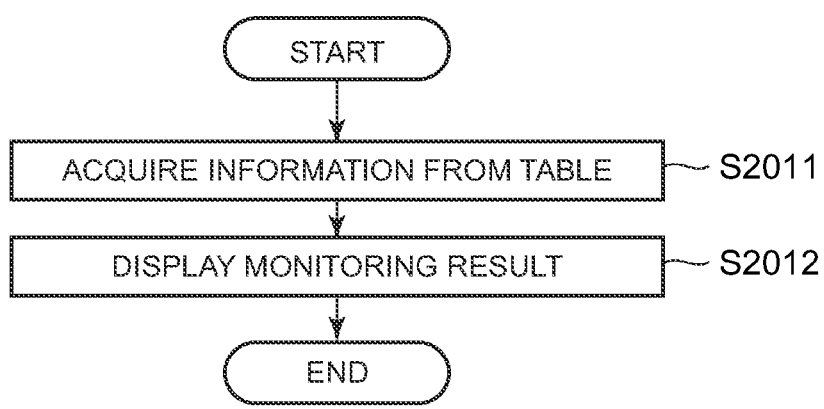
FIG. 21 shows the flow of processing for displaying a monitoring result.

FIG. 21 shows the flow of processing for displaying a monitoring result.

Figure 22:
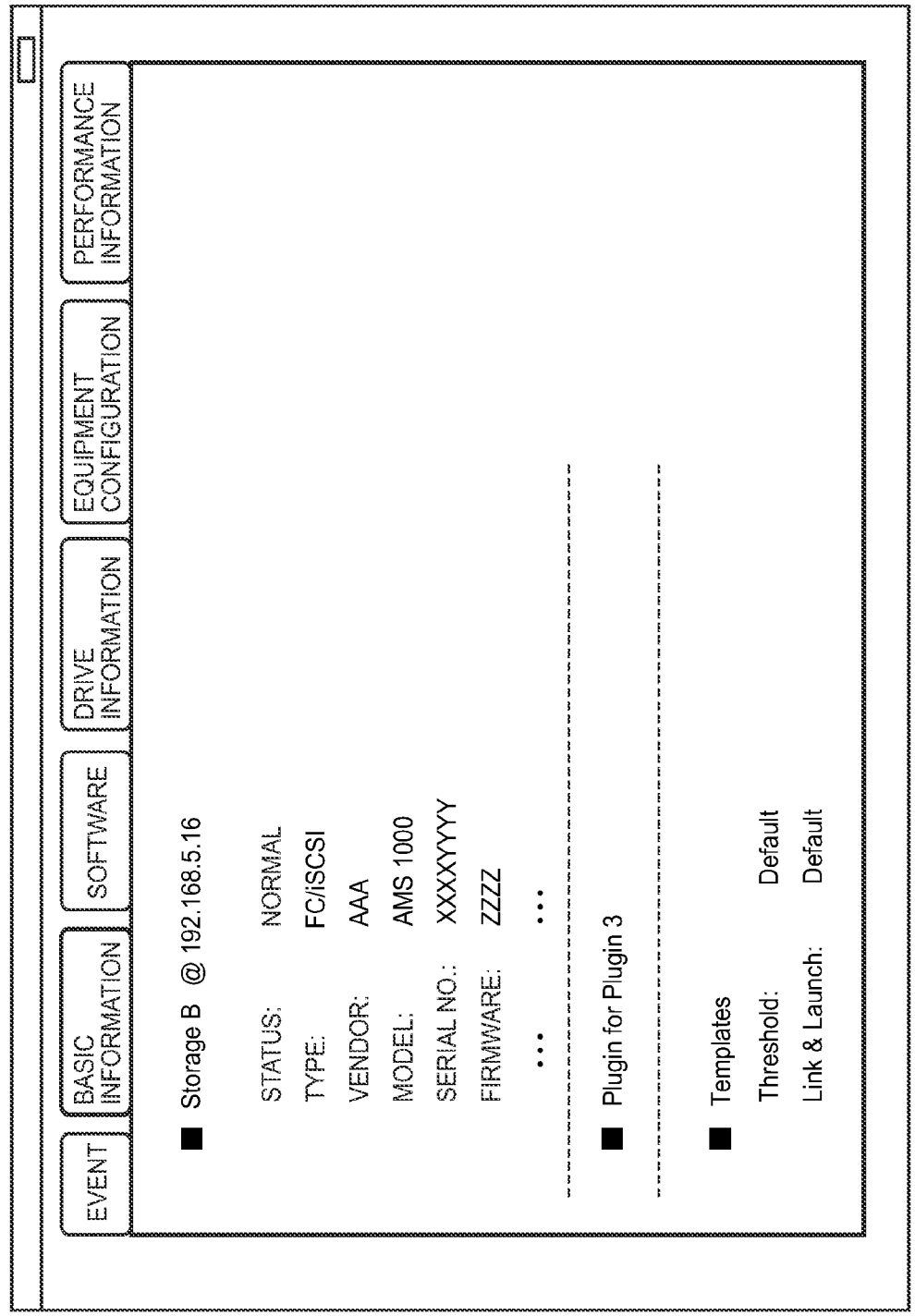
FIG. 22 shows an example of a screen via which a monitoring result is displayed.

The GUI module 222, in a case where the user-desired monitoring-target node device has been selected from the monitoring home GUI 1901, acquires information related to this monitoring-target node device (information denoting the monitoring result) from the monitoring target management table 215 through the service module 221 (S2011). Then, the GUI module 222, for example, displays the acquired information in the screen shown in FIG. 22.

Furthermore, the information of the monitoring-target node device acquired in the flow of processing of FIG. 20 and displayed in FIG. 21 may be the node device settings and the status of the components configuring the node device as shown in FIG. 19 (or node device itself). In addition, this information may denote an event that either the node device or a component configuring the node device detected (for example, a case in which the communication connection from the storage apparatus controller to the host was disconnected).

<Specification of Network Service Root Cause Based on Information Acquired Using Plugin>

In a computer system, it is conceivable that the monitoring-target node device is either a server or a client of a network service of some sort. For example, when a storage I/O is regarded as a network service, the host device has the role of the client of the network service, and the storage apparatus has the role of the network service server. In a computer system that utilizes a network service like this, there are times when an event generated by a certain monitoring-target node device generates a different event in another monitoring-target node device, making management by the administrator almost impossible.

To facilitate this situation, the node management device 102 may specify and display the root cause event and the event that was generated by the root cause event from among a plurality of events received from the monitoring-target node device.

In a case where a root cause specification like this is realized, the node management device 102, for example, comprises the following software and information.

(1) General rule information. Stores a set of the type of event and the type of node device (or node device component) that generated the event, one or more of which must be detected in order to specify an event that occurred in a certain type of node device (or node device component) as the root cause event.

(2) Topology information. In addition to storing the setting information (for example, IP address) of the monitoring-target node device (and its component) and the type of the monitoring-target node device, this information also stores the dependency relationship between monitoring-target node devices (and their components). Examples of the dependency relationship are the relationship between the component and the monitoring-target node device in which this component is embedded (defined), the "network coupling relationship" of the monitoring-target node devices, and the server-client relationship of the network service that the relevant device uses. This information is obtained via the above-described discovery process.

(3) Expanded rule information. This information is created based on the general rule information and the topology information, and stores the type of event and the IP address of node device (or node device component) that generated the event, one or more of which must be detected in order to specify an event, which occurred in a node device (or node device component) having a certain IP address, as the root cause event.

(4) Root cause specification module. This module creates the expanded rule information based on the general rule information and the topology information. Further, this module retrieves information related to an event that the node management device stored based on the expanded rule information, specifies the root cause event, and displays the root cause event information.

Now then, in a case where the processing of this information and the module identify a monitoring-target node device with something other than an IP address, another identifier may be used.

Furthermore, the type of the monitoring-target node device included in the above-mentioned topology information may be inferred based on information obtained with respect to the node device discovered by the management software 220, but a notification from the plugin information package is preferable. Whichever the case, the management software 220 is able to create the expanded rule even for a node device discovered using the plugin information package in accordance with a condition specified by either the plugin file or the management software 220. As a result of this, it becomes possible for the management software 220 to display a root cause even for event information acquired using the plugin information package.

Industrial Applicability

The preferred embodiment of the present invention has been described above, but this is merely an example for explaining the present invention, and does not purport to limit the scope of the present invention to this embodiment. The present invention may be put into practice in a variety of other modes. For example, a program may be disposed in one part of the plugin file, and this program may executed in place of a portion of the node discovery process and the process for acquiring information from the monitoring-target node device. The present invention, which is able to select the propriety of a plugin application for an address range, is effective for this kind of plugin file as well.

Reference Signs List

101 Node device
102 Management computer

The invention claimed is:
1. A node management apparatus comprising:
a storage resource;
a communication interface device; and
a processor that is coupled to the storage resource and the communication interface device,
wherein the storage resource stores a plurality of plugin information packages, which are information packages each comprising definition information,
wherein the definition information is information denoting at the least one of the following (N1) through (N3):
(N1) a method for acquiring information from a node device;
(N2) an item of information to be acquired from the node device; and
(N3) mapping information for a node management model of information acquired from the node device, and
wherein the processor is configured to:
(A) receive first inputs specifying a first address range and a second address range;
(B) receive second inputs specifying at least one first valid plugin information package for the first address range and at least one second valid plugin information for the second address range, from the plurality of plugin information packages;
(C) select a certain address from the first address range and the second address range;
(D) acquire at least one valid plugin package information for the certain address, based on the first inputs and the second inputs;
(E) access the certain address using the at least one valid plugin package information to discover a unmonitored node device;
(F) determine whether or not a result of the access satisfies a discovery condition of the at least one valid plugin package information; and
(G) if the access satisfies with a certain plugin package information among the at least one valid plugin package information, store a correspondence between the certain plugin package information and the certain address to start monitoring the unmonitored node device;

wherein in (E), the processor is configured to use a plurality of protocols with a plurality of authentication information;
wherein the storage resource stores login management information indicating correspondence between the plurality of authentication information and the plurality of protocols;
wherein the storage resource stores priorities of the plurality of protocols; and
wherein in (E), the processor is configured to control an order to use the plurality of protocols.
2. The node management apparatus according to claim 1, wherein the processor is further configured to:
(H) instruct to display an ID of the certain plugin package information with the certain address.
3. The node management apparatus according to claim 1, wherein the certain plugin package information comprises a type of a node device,
wherein the storage resource stores a general rule information including a type of node device being a root cause and a type of node device generating an event due to the root cause, and
wherein the processor is configured to:
(I) based on the type of the node device in the certain plugin package information and the general rule information, specify a root cause of an event detected from the monitored node device.
4. The node management apparatus according to claim 2, wherein the processor is configured to:
(J) instruct to display a status of process (D) through (G) to the certain address.
5. The node management apparatus according to claim 2, wherein the processor is configured to:
(K) monitor an event or a status of a monitored node device having the certain address, using the certain plugin package information.
6. A non-transitory computer readable storage medium storing a computer program for a computer including a storage resource and a processor,
wherein the storage resource stores a plurality of plugin information packages, which are information packages each comprising definition information,
wherein the definition information is information denoting at the least one of the following (N1) through (N3):
(N1) a method for acquiring information from a node device;
(N2) an item of information to be acquired from the node device; and
(N3) mapping information for a node management model of information acquired from the node device,
wherein the computer program is configured to cause the computer to:
(A) receive first inputs specifying a first address range and a second address range;
(B) receive second inputs specifying at least one of first valid plugin information package for the first address range, and at least one of second valid plugin information for the second address range, from the plurality of plugin information packages;
(C) select a certain address from the first address range and the second address range;
(D) acquire at least one valid plugin package information for the certain address, based on the first inputs and the second inputs;
(E) access the certain address using the at least one valid plugin package information for discover a unmonitored node device;

(F) determine whether or not a result of the access satisfies a discovery condition of the at least one valid plugin package information; and (G) if the access satisfies a certain plugin package information among the at least one valid plugin package information, store a correspondence between the certain plugin package information and the certain address to start monitoring the unmonitored node device;

wherein in (E), the computer program is further configured to cause the computer to use a plurality of protocols with a plurality of authentication information;

wherein the storage resource stores login management information indicating correspondence between the plurality of authentication information and the plurality of protocols;

wherein the storage resource stores priorities of the plurality of protocols; and wherein in (E), the computer program is further configured to cause the computer to control an order to use the plurality of protocols.

7. The non-transitory computer readable storage medium according to claim 6, wherein the computer program is further configured to cause the computer to:

(H) instruct to display an ID of the certain plugin package information with the certain address.

8. The non-transitory computer readable storage medium according to claim 6, wherein the certain plugin package information comprises a type of a node device, wherein the storage resource stores a general rule information including a type of node device being a root cause and a type of node device generating an event due to the root cause, and wherein the computer program is further configured to cause the computer to:

(I) based on the type of the node device in the certain plugin package information and the general rule information, specify a root cause of an event detected from a monitored node device.

9. The non-transitory computer readable storage medium according to claim 7, wherein the computer program is further configured to cause the computer to:

(J) instruct to display a status of process (D) through (G) to the certain address.

10. The non-transitory computer readable storage medium according to claim 7, wherein the computer program is further configured to cause the computer to:

(K) monitor an event or a status of a monitored node device having the certain address, using the certain plugin package information.

11. A server computer for installing a computer program to a computer, comprising a processor coupled with a memory, the computer program stored in the memory is configured to cause the server computer to:

(O) store a plurality of plugin information packages, which are information packages each comprising definition information, the definition information is information denoting at the least one of the following (N1) through (N3):

(N1) a method for acquiring information from a node device;

(N2) an item of information to be acquired from the node device; and (N3) mapping information for a node management model of information acquired from the node device;

(A) receive first inputs specifying a first address range and a second address range;

(B) receive second inputs specifying at least one of first valid plugin information package for the first address range, and at least one of second valid plugin information for the second address range, from the plurality of plugin information packages;

(C) select a certain address from the first address range and the second address range;

(D) acquire at least one valid plugin package information for the certain address, based on the first inputs and the second inputs;

(E) access the certain address using the at least one valid plugin package information for discover a unmonitored node device;

(F) determine whether or not a result of the access satisfies a discovery condition of the at least one valid plugin package information; and (G) if the access satisfies a certain plugin package information among the at least one valid plugin package information, store a correspondence between the certain plugin package information and the certain address to start monitoring the unmonitored node device;

wherein in (E), the computer program is further configured to cause the computer to use a plurality of protocols with a plurality of authentication information;

wherein the storage resource stores login management information indicating correspondence between the plurality of authentication information and the plurality of protocols;

wherein the storage resource stores priorities of the plurality of protocols; and wherein in (E), the computer program is further configured to cause the computer to control an order to use the plurality of protocols.

12. The server computer according to claim 11, wherein computer program is further configured to cause the computer to:

(H) instruct to display an ID of the certain plugin package information with the certain address.

13. The server computer according to claim 11, wherein the certain plugin package information comprises a type of a node device, wherein the storage resource stores a general rule information including a type of node device being a root cause and a type of node device generating an event due to the root cause, and wherein computer program is further configured to cause the computer to:

(I) based on the type of the node device in the certain plugin package information and the general rule information, specify a root cause of an event detected from the monitored node device.

14. The server computer according to claim 12, wherein the computer program is further configured to cause the computer to:

(j) instruct to display a status of process (D) through (G) to the certain address.

15. The server computer according to claim 12, wherein the computer program is further configured to cause the computer to:

(K) monitor an event or a status of the monitored node device having the certain address, using the certain plugin package information.

* * * * *